United States Patent
Wang et al.

(10) Patent No.: US 12,477,553 B2
(45) Date of Patent: Nov. 18, 2025

(54) CONTROL CHANNEL MONITORING METHOD AND DEVICE, TERMINAL, BASE STATION AND STORAGE MEDIUM

(71) Applicant: DATANG MOBILE COMMUNICATIONS EQUIPMENT CO., LTD., Beijing (CN)

(72) Inventors: Junwei Wang, Beijing (CN); Rui Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 504 days.

(21) Appl. No.: 17/913,817

(22) PCT Filed: Mar. 18, 2021

(86) PCT No.: PCT/CN2021/081600
§ 371 (c)(1),
(2) Date: Sep. 22, 2022

(87) PCT Pub. No.: WO2021/197088
PCT Pub. Date: Oct. 7, 2021

(65) Prior Publication Data
US 2024/0215037 A1     Jun. 27, 2024

(30) Foreign Application Priority Data

Apr. 2, 2020  (CN) .......................... 202010255749.6

(51) Int. Cl.
*H04W 24/02*  (2009.01)
*H04L 5/00*  (2006.01)
(Continued)

(52) U.S. Cl.
CPC ........... *H04W 72/23* (2023.01); *H04L 5/0053* (2013.01); *H04W 72/0446* (2013.01)

(58) Field of Classification Search
CPC . H04W 72/23; H04W 72/0446; H04W 24/02; H04L 5/0053
See application file for complete search history.

(56) References Cited

U.S. PATENT DOCUMENTS 1,206,900 A * 12/1916 Luo et al. ............... B65B 41/18
53/169
2009/0088148 A1    4/2009 Chung et al.
(Continued)

FOREIGN PATENT DOCUMENTS

CN         108365936      *   8/2018   ........... H04L 5/0053
CN         108365936 A        8/2018
(Continued)

OTHER PUBLICATIONS

3GPP TSG-RAN WG1#87, R1-1612063 Title:Single-part/Multi-part PDCCH (Year: 2016).*
(Continued)

*Primary Examiner* — Christopher M Crutchfield
*Assistant Examiner* — Abusayeed M Haque
(74) *Attorney, Agent, or Firm* — KILPATRICK TOWNSEND & STOCKTON LLP

(57) ABSTRACT

Provided are a control channel monitoring method and device, a terminal, a base station and a storage medium. The method includes: determining a monitoring slot group for control channel monitoring, and the monitoring slot group is used for characterizing a slot group capable of sharing control channel monitoring capability under a specified slot condition; determining a search space of the monitoring slot group; and monitoring control channels indicated by the search space. Therefore, in the embodiments of the present disclosure, control channels are monitored by taking a monitoring slot group as a unit, and a problem that a terminal is unable to complete the process of receiving and configuring control signaling in a corresponding time slot due to (Continued)

the increase in an SCS is avoided, and the complexity of the terminal to monitor control channels is also reduced.

20 Claims, 8 Drawing Sheets

(51) Int. Cl.
*H04W 72/0446* (2023.01)
*H04W 72/23* (2023.01)

(56) References Cited

U.S. PATENT DOCUMENTS

| | | | |
|---|---|---|---|
| 2019/0223159 A1 | 7/2019 | John Wilson et al. | |
| 2021/0021536 A1* | 1/2021 | Ganesan | H04L 47/56 |
| 2022/0201638 A1* | 6/2022 | Arrobo Vidal | H04W 48/08 |
| 2022/0216964 A1* | 7/2022 | Mondal | H04L 5/0023 |
| 2022/0256436 A1* | 8/2022 | Guo | H04L 47/34 |
| 2022/0312481 A1* | 9/2022 | Talarico | H04W 74/0866 |
| 2024/0214109 A1* | 6/2024 | Zhang | H04L 1/0004 |

FOREIGN PATENT DOCUMENTS

| | | |
|---|---|---|
| CN | 109474384 A | 3/2019 |
| CN | 109729593 A | 5/2019 |
| CN | 109963339 A | 7/2019 |
| CN | 110536420 A | 12/2019 |
| CN | 110839287 A | 2/2020 |
| WO | 2018126777 A1 | 7/2018 |
| WO | 2019099435 A1 | 5/2019 |
| WO | 2020033652 A1 | 2/2020 |

OTHER PUBLICATIONS

3GPP TSG RAN WG1 meeting#95 R1-1812923 Title:Consideration of seperate DL and UL beam reporting (Year: 2018).*
European Patent Office, the Extended European Search Report Issued in Application No. 21780717.1, Mar. 13, 2024, Germany, 10 pages.
ISA State Intellectual Property Office of the People's Republic of China, first search report issued in application No. 2020102557496.
3GPP TS 38.213 V15.8.0, 3rd Generation Partnership Project;Technical Specification Group Radio Access Network; NR;Physical layer procedures for control (Release 15), total 109 pages, Dec. 2019.

* cited by examiner

CONTROL CHANNEL MONITORING METHOD AND DEVICE, TERMINAL, BASE STATION AND STORAGE MEDIUM

CROSS-REFERENCE TO RELATED APPLICATION

The present disclosure is a US National Stage of International Application No. PCT/CN2021/081600, filed on Mar. 18, 2021, which claims priority to Chinese Application No. 202010255749.6, filed on Apr. 2, 2020, entitled "Control Channel Monitoring Method and Device, Terminal, Base station and Storage medium", which are hereby incorporated by reference in their entireties.

FIELD

The present disclosure relates to the field of communication, and in particular, to a method and a device for monitoring control channels, a terminal, a base station and a storage medium.

BACKGROUND

With the development of wireless communication, users have raised higher requirements for mobile communication, especially for communication bandwidth and communication rate. It is necessary to develop a frequency spectrum with a larger bandwidth to meet users' requirements for high communication rate.

In the 3GPP standard, mobile wireless communication in a frequency band of 52.6 GHz-71 GHz has been studied. Higher communication frequency will bring greater bandwidth advantages, but brings greater challenges to wireless communication design, since larger Doppler frequency offsets will occur and larger phase noise will be generated due to higher frequencies. A higher sub-carrier spacing (SCS) is adopted to overcome the influence of high frequencies on Doppler frequency offsets and phase noise.

Before conducting a data communication between a base station and a terminal, the base station should transmit a scheduling signaling to the terminal. The scheduling signaling is transmitted on a physical downlink control channel (PDCCH). One base station will serve a plurality of terminals and downlink channel quality is changeable, and then in order to realize a flexible scheduling of the base station, it is stipulated in the related protocol that the terminal should monitor a plurality of PDCCH candidates in each slot. The more PDCCH candidates to be monitored by the terminal, the more flexible the base station scheduling is, and the capability of the terminal to monitor channels will be required to be stronger, which will cause a problem of a balance between the flexibility in the base station scheduling and the monitoring capability for a terminal.

However, with the increase of SCS, the slot length becomes smaller, which will cause that the terminal fails to complete the process of receiving and configuring a control signaling in the corresponding slot.

SUMMARY

In view of the above problems in traditional arts, embodiments of the present disclosure provide a method and a device for monitoring control channels, a terminal, a base station and a storage medium.

An embodiment of the present disclosure provides a method for monitoring control channels, performed by a terminal, including:
  determining a monitoring slot group for control channel monitoring, where the monitoring slot group is used for characterizing a slot group capable of sharing control channel monitoring capability under a specified slot condition;
  determining a search space of the monitoring slot group; and
  monitoring the control channels indicated by the search space.

In an embodiment, the specified slot condition includes that a sub-carrier spacing (SCS) is greater than 120 KHz; and the sharing control channel monitoring capability is used for characterizing a control channel monitoring capability corresponding to more than one slots.

In an embodiment, the determining a monitoring slot group for control channel monitoring includes:
  determining first configuration information for the monitoring slot group according to an interface protocol between a first node and a second node, and determining the monitoring slot group according to the first configuration information; or
  receiving the first configuration information indicated by a base station, and determining the monitoring slot group according to the first configuration information.

In an embodiment, the first configuration information includes at least one of
  a number of slots included in the monitoring slot group;
  a maximum number of control channel candidates in the monitoring slot group; or
  a maximum number of control channel elements (CCEs) in the monitoring slot group.

In an embodiment, the first configuration information further satisfies at least one of
  the number of slots is associated with the SCS;
  the maximum number of control channel candidates is associated with the SCS; or
  the maximum number of CCEs is associated with the SCS.

In an embodiment, the number of slots is 4 in case that the SCS is 480 KHz; and the number of slots is 8 in case that the SCS is 960 KHz.

In an embodiment, the number of slots is determined based on a ratio of the SCS to a preset reference SCS.

In an embodiment, the monitoring control channels indicated by the search space includes:
  monitoring the control channels indicated by the search space when a number of control channels to be monitored is not greater than the maximum number of control channel candidates.

In an embodiment, the determining the search space of the monitoring slot group includes:
  determining second configuration information for the search space according to an interface protocol between a first node and a second node, and determining the search space according to the second configuration information; or
  receiving the second configuration information indicated by a base station, and determining the search space according to the second configuration information.

In an embodiment, the second configuration information includes:
  a first indication information, used for indicating a monitoring slot group with a control channel monitoring occasion; and a second indication information, used for indicating that the control channel monitoring occasion is at a designated position in the monitoring slot group, where the designated position includes one designated slot or a plurality of designated slots in the monitoring slot group.

In an embodiment, the second configuration information further includes:
an offset of start position of the monitoring slot group, where the offset of start position is used for indicating respective slots included in the monitoring slot group.

In an embodiment, the monitoring control channels indicated by the search space includes:
monitoring control channels at one designated slot or the plurality of designated slots in the monitoring slot group.

In an embodiment, the method further includes:
receiving or transmitting a shared data channel according to the one or more monitored control information after the control channel monitoring within all search spaces in the monitoring slot group has been completed.

An embodiment of the present disclosure provides a method for monitoring control channels, performed by a base station, including:
determining a monitoring slot group for control channel monitoring, where the monitoring slot group is used for characterizing a slot group capable of sharing control channel monitoring capability under a specified slot condition;
determining a search space of the monitoring slot group; and transmitting control channels indicated by the search space for indicating a terminal to monitor the control channels indicated by the search space.

In an embodiment, the specified slot condition includes that a sub-carrier spacing (SCS) is greater than 120 KHz; and the sharing control channel monitoring capability is used for characterizing a control channel monitoring capability corresponding to more than one slots.

In an embodiment, the determining a monitoring slot group for control channel monitoring includes:
determining first configuration information for the monitoring slot group according to an interface protocol between a first node and a second node, and
determining the monitoring slot group according to the first configuration information.

In an embodiment, the first configuration information includes at least one of
a number of slots included in the monitoring slot group;
a maximum number of control channel candidates in the monitoring slot group; or
a maximum number of control channel elements (CCEs) in the monitoring slot group.

In an embodiment, the first configuration information further satisfies at least one of:
the number of slots is associated with the SCS;
the maximum number of control channel candidates is associated with the SCS; or
the maximum number of CCEs is associated with the SCS.

In an embodiment, the number of slots is 4 in case that the SCS is 480 KHz; and the number of slots is 8 in case that the SCS is 960 KHz.

In an embodiment, the number of slots is determined based on a ratio of the SCS to a preset reference SCS.

In an embodiment, the determining the search space of the monitoring slot group includes:

determining second configuration information for the search space according to an
interface protocol between a first node and a second node; and
determining the search space according to the second configuration information.

In an embodiment, the second configuration information includes:
first indication information, used for indicating a monitoring slot group with a control channel monitoring occasion; and
second indication information, used for indicating that the control channel monitoring occasion is at a designated position in the monitoring slot group, where the designated position includes one designated slot or a plurality of designated slots in the monitoring slot group.

In an embodiment, the second configuration information further includes:
an offset of start position of the monitoring slot group, where the offset of start position is used for indicating respective slots included in the monitoring slot group.

In an embodiment, the transmitting the control channels indicated by the search space includes:
transmitting the control channel at one designated slot or the plurality of designated slots within the monitoring slot group.

In an embodiment, the transmitting the control channels indicated by the search space includes:
transmitting a control information within one or more search spaces in the monitoring slot group for indicating the terminal to receive or transmit a shared data channel according to one or more monitored control information after the control channel monitoring within all search spaces in the monitoring slot group has been completed.

An embodiment of the present disclosure provides a device for monitoring control channels, applied to a terminal, including:
a first determining device, used to determine a monitoring slot group for control channel monitoring, where the monitoring slot group is used for characterizing a slot group capable of sharing control channel monitoring capability under a specified slot condition;
a second determining device, used to determine a search space of the monitoring slot group; and
a control channel monitoring device, used to monitor the control channels indicated by the search space.

An embodiment of the present disclosure provides a device for monitoring control channels, applied to a base station, including:
a third determining device, used to determine a monitoring slot group for control channel monitoring, where the monitoring slot group is used for characterizing a slot group capable of sharing control channel monitoring capability under a specified slot condition;
a fourth determining device, used to determine a search space of the monitoring slot group;
a control channel transmitting device, used to transmit the control channels indicated by the search space for indicating a terminal to monitor the control channels indicated by the search space.

An embodiment of the present disclosure provides a terminal, including a processor and a memory storing a program that is executable by the processor, where the program, when executed by the processor, causes the processor to perform the following steps of:

determining a monitoring slot group for control channel monitoring, where the monitoring slot group is used for characterizing a slot group capable of sharing control channel monitoring capability under a specified slot condition;

determining a search space of the monitoring slot group; and monitoring control channels indicated by the search space.

In an embodiment, the specified slot condition includes that a sub-carrier spacing (SCS) is greater than 120 KHz; and the sharing control channel monitoring capability is used for characterizing a control channel monitoring capability corresponding to more than one slots.

In an embodiment, the determining a monitoring slot group for control channel monitoring includes:

determining first configuration information for the monitoring slot group according to an interface protocol between a first node and a second node, and determining the monitoring slot group according to the first configuration information; or receiving the first configuration information indicated by a base station, and determining the monitoring slot group according to the first configuration information.

In an embodiment, the first configuration information includes at least one of:

a number of slots included in the monitoring slot group;

a maximum number of control channel candidates in the monitoring slot group; or a maximum number of control channel elements (CCEs) in the monitoring slot group.

In an embodiment, the monitoring control channels indicated by the search space includes:

monitoring the control channels indicated by the search space when a number of control channels to be monitored is not greater than the maximum number of control channel candidates.

In an embodiment, the determining the search space of the monitoring slot group includes:

determining second configuration information for the search space according to an interface protocol between a first node and a second node, and determining the search space according to the second configuration information; or receiving the second configuration information indicated by a base station, and determining the search space according to the second configuration information.

In an embodiment, the second configuration information includes:

a first indication information, used for indicating a monitoring slot group with a control channel monitoring occasion; and a second indication information, used for indicating that the control channel monitoring occasion is at a designated position in the monitoring slot group, where the designated position includes one designated slot or a plurality of designated slots in the monitoring slot group.

In an embodiment, the second configuration information further includes:

an offset of start position of the monitoring slot group, where the offset of start position is used for indicating respective slots included in the monitoring slot group.

In an embodiment, the monitoring control channels indicated by the search space includes:

monitoring the control channels at one designated slot or the plurality of designated slots in the monitoring slot group.

In an embodiment, the processor further performs the step of receiving or transmitting a shared data channel according to the one or more monitored control information after the control channel monitoring within all search spaces in the monitoring slot group has been completed.

An embodiment of the present disclosure provides a base station, including a memory, a processor and a memory storing a program that is executable by the processor, where the program, when executed by the processor, causes the processor to perform the following steps:

determining a monitoring slot group for control channel monitoring, where the monitoring slot group is used for characterizing a slot group capable of sharing control channel monitoring capability under a specified slot condition;

determining a search space of the monitoring slot group;

transmitting control channels indicated by the search space for indicating a terminal to monitor the control channels indicated by the search space.

In an embodiment, the specified slot condition includes that a sub-carrier spacing (SCS) is greater than 120 KHz; the sharing control channel monitoring capability is used for characterizing a control channel monitoring capability corresponding to more than one slots.

In an embodiment, the determining a monitoring slot group for control channel monitoring includes:

determining first configuration information for the monitoring slot group according to an interface protocol between a first node and a second node, and determining the monitoring slot group according to the first configuration information.

In an embodiment, the first configuration information includes at least one of:

a number of slots included in the monitoring slot group;

a maximum number of control channel candidates in the monitoring slot group; or a maximum number of control channel elements (CCEs) in the monitoring slot group.

In an embodiment, the determining the search space of the monitoring slot group includes:

determining second configuration information for the search space according to an interface protocol between a first node and a second node; and determining the search space according to the second configuration information.

In an embodiment, the second configuration information includes:

a first indication information, used for indicating a monitoring slot group with a control channel monitoring occasion; and a second indication information, used for indicating that the control channel monitoring occasion is at a designated position in the monitoring slot group, where the designated position includes one designated slot or a plurality of designated slots in the monitoring slot group.

In an embodiment, the second configuration information further includes:

an offset of start position of the monitoring slot group, where the offset of start position is used for indicating respective slots included in the monitoring slot group.

In an embodiment, the transmitting the control channels indicated by the search space includes:

transmitting the control channels at one designated slot or the plurality of designated slots in the monitoring slot group.

In an embodiment, the transmitting the control channels indicated by the search space includes:

transmitting a control information within one or more search spaces in the monitoring slot group for indicating the terminal to receive or transmit a shared data channel according to one or more monitored control information after the control channel monitoring within all search spaces in the monitoring slot group has been completed.

An embodiment of the present disclosure provides a non-transitory computer-readable storage medium storing a computer program that, when executed by a processor, causes the processor to perform the steps of the above method for monitoring control channels performed by a terminal.

An embodiment of the present disclosure provides a non-transitory computer-readable storage medium storing a computer program that, when executed by a processor, causes the processor to perform the steps of the above method for monitoring control channels performed by a base station.

An embodiment of the present disclosure provides a method and a device for monitoring control channels, a terminal, a base station and a storage medium. By determining a monitoring slot group for control channel monitoring, where the monitoring slot group is used for characterizing a slot group capable of sharing control channel monitoring capability under a specified slot condition, determining a search space of the monitoring slot group, and monitoring the control channels indicated by the search space, control channels are monitored in a unit of a monitoring slot group, and the problem that a terminal is unable to complete the process of receiving and configuring a control signaling in the corresponding slot due to the increase in SCS is avoided, and the complexity of the terminal to monitor the control channels is also reduced.

BRIEF DESCRIPTION OF THE DRAWINGS

In order to more clearly illustrate the solutions according to the embodiments of the present disclosure or the related art, the accompanying drawings required to be used in the description of the embodiments or the related art will be briefly described below, and it should be noted that the drawings in the following descriptions are some embodiments of the present disclosure.

DETAILED DESCRIPTION

Figure 1:
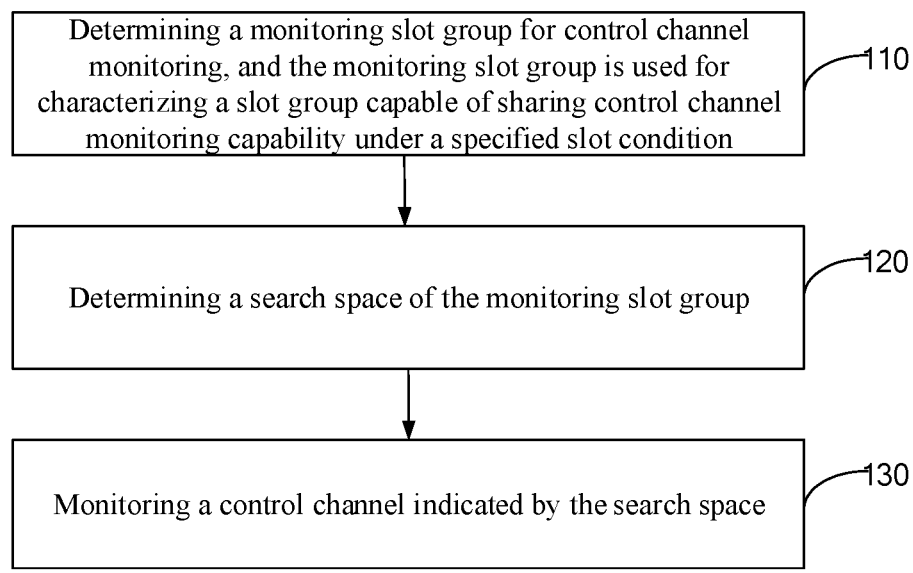
FIG. 1 is a flowchart of a method for monitoring control channels according to embodiments of the present disclosure.

The embodiments of the present disclosure will be described clearly and completely below with reference to the drawings in the embodiments of the present disclosure. The described embodiments are a part of the embodiments of the present disclosure, rather than all of the embodiments.

In order to clearly describe the solutions of the embodiments of the present disclosure, in the respective embodiments of the present disclosure, if words such as "first" and "second" are used to distinguish the identical or similar items with substantially the same functions and actions, words such as "first" and "second" do not limit the quantity and execution order.

With the development of wireless communication, users have raised higher requirements for mobile communication, especially for communication bandwidth and communication rate. In order to meet users' requirements for high communication rate, it is necessary to develop a frequency spectrum with a larger bandwidth.

At present, in the 3GPP standard, mobile wireless communication in a frequency band of 52.6 GHz-71 GHz has been studied. Higher communication frequency will bring greater bandwidth advantages, but brings greater challenges to wireless communication design, since larger Doppler frequency offsets will occur and larger phase noise will be generated due to higher frequencies. A higher sub-carrier spacing (SCS) is adopted to overcome the influence of high frequencies on Doppler frequency offsets and phase noise.

Before conducting a data communication between a base station and a terminal, the base station should transmit a scheduling signaling to the terminal. The scheduling signaling is transmitted on a physical downlink control channel (PDCCH). One base station will serve a plurality of terminals and downlink channel quality is changeable, and then in order to realize a flexible scheduling of the base station, it is stipulated in the related protocol that the terminal should monitor a plurality of PDCCH candidates in each slot. The more PDCCH candidates to be monitored by the terminal, the more flexible the base station scheduling is, and the capability of the terminal to monitor channels will be required to be stronger, which will cause a problem of a balance between the flexibility in the base station scheduling and the monitoring capability for a terminal.

However, the number of PDCCH candidates to be monitored by the terminal in each slot with SCS below 120 KHz is defined in the current standard. In case of the SCS is greater than 120 KHz, there is no better optimization solution about defining the capability of monitoring the number of PDCCH candidates by the terminal.

(1) Pdcch Candidate

The PDCCH is used to transmit downlink control information (DCI), and the transmitted information includes common control information and user-specific control information.

In order to facilitate the description of the PDCCH, the concept of control resource set (CORESET) is introduced into new radio (NR). The CORESET is used for characterizing the size of the PDCCH resource block. A CORESET consists of several control channel elements (CCEs). Every 6 CCEs constitute a resource element group (REG). Each REG includes a resource block (RB).

A CORESET includes a plurality of PDCCH candidates to be monitored by a terminal. In general, any one or more CCEs can constitute PDCCH candidates. It is agreed in the current standard that a PDCCH consisting of 1 CCE is called as PDCCH candidates with a CCE aggregation level of 1; a PDCCH consisting of 2 CCEs is called as PDCCH candidates with a CCE aggregation level of 2; and a PDCCH consisting of 4 CCEs is called as PDCCH candidates with a CCE aggregation level of 4, and so on. The CCE aggregation levels supported by the current standard protocol are: 1, 2, 4, 8 and 16.

In a CORESET, there will be a plurality of PDCCH candidates with the same CCE aggregation level, and the number specified by the current standard protocol is 0, 1, 2, 3, 4, 5, 6 and 8.

For example, the number of PDCCH candidates for a broadcast channel and the CCE aggregation levels are shown in table 1.

TABLE 1

| CCE aggregation levels | the number of PDCCH candidates |
|---|---|
| 4 | 4 |
| 8 | 2 |
| 16 | 1 |

For the control channel used to schedule and transmit the broadcast channel, if the CCE aggregation level is 4, there are 4 PDCCH candidates; if the CCE aggregation level is 8, there are 2 PDCCH candidates; and if the CCE aggregation level is 16, there is 1 candidate PDCCH; that is, a total of 4+2+1=7 PDCCH candidates are needed to be monitored by the terminal.

(2) Type of the Search Space

The search space defines a time range in which the terminal needs to monitor PDCCH. The search space includes a common search space (CSS) and a user equipment specific search space (USS). CSS refers to the search space in which all terminals or a group of terminals need to monitor PDCCH; while USS is the search space in which only a terminal individually configured by a base station needs to monitor PDCCH.

For CSS, a first number of control channel candidates to be monitored is denoted as $M_{PDCCH}^{css}$. For USS, a second number of control channel candidates to be monitored is denoted as $M_{PDCCH}^{uss}$. In each slot, a total number $M_{PDCCH}^{max,slot,\mu}$ of PDCCH candidates to be monitored is the sum of the first number and the second number, and does not exceed a threshold. The monitoring capability determined by the current standard protocol is shown in table 2.

TABLE 2

| $\mu$ | $M_{PDCCH}^{max,\,slot,\,\mu}$ | Remark |
|---|---|---|
| 0 | 44 | SCS = 15 KHz |
| 1 | 36 | SCS = 30 KHz |
| 2 | 22 | SCS = 60 KHz |
| 3 | 20 | SCS = 120 KHz |

$\mu$ is the factor or index value for calculating SCS, i.e. SCS=$2^{\mu} \times 15$ KHz. For example, if $\mu$ is 0, the SCS is 15 KHz, and for a slot whose SCS is 15 KHz, the maximum number of PDCCH candidates to be monitored is 44.

Similarly, for CSS, a first number of CCEs required to satisfy the number of the above control channel candidates to be monitored is denoted as: $C_{PDCCH}^{css}$. For USS, a second number of CCEs required to satisfy the number of the above control channel candidates to be monitored is denoted as: $C_{PDCCH}^{uss}$. In each slot, the total number $C_{PDCCH}^{maxslot,\mu}$ of CCEs is the sum of the first number of CCEs and the second number of CCEs, and does not exceed a threshold. The monitoring capability determined by the current standard protocol is shown in table 3.

TABLE 3

| $\mu$ | $C_{PDCCH}^{max,\,slot,\,\mu}$ | Remark |
|---|---|---|
| 0 | 56 | SCS = 15 KHz |
| 1 | 56 | SCS = 30 KHz |
| 2 | 48 | SCS = 60 KHz |
| 3 | 32 | SCS = 120 KHz |

Therefore, the number of PDCCH candidates to be monitored and the number of CCEs defined in a current NR protocol are in units of slots. That is, the terminal need to perform a blind monitoring for PDCCH in units of slots, and then the terminal receives physical downlink shared channel (PDSCH) data or transmits physical uplink shared channel (PUSCH) data according to the monitored DCI content.

For example, when the base station schedules the terminal to receive one PDSCH, the base station first transmits scheduling information or DCI on a PDCCH, where the DCI indicates the time domain/frequency domain information, the modulation and coding rate and other information of PDSCH. The terminal monitors the PDCCH at the appointed slot position (the appointed slot is configured by the base station), parses the DCI content, configures receiving parameters of PDSCH according to the parsed DCI content, and the PDSCH demodulating & decoding device is configured to demodulate and decode PDSCH according to the configuration information.

The time spent by a PDCCH receiving and monitoring device is t1; the time spent by the PDCCH receiving and monitoring device to transmit the monitored DCI information to a DCI parsing device is t2; the time spent by the DCI parsing device is t3; the time spent by the DCI parsing device to transmit PDSCH configuration information to the PDSCH demodulating & decoding device is t4; and the time spent by the PDSCH demodulating & decoding device is t5.

When the SCS is relatively small, for example, less than or equal to 120 KHz, the slot length is greater than or equal to 0.125 ms. When each slot has DCI scheduling information, the configuration processes of PDCCH monitoring, DCI analysis and PDSCH scheduling information can be completed within 0.125 ms. However, with the increase of SCS, the slot length becomes smaller, and it is difficult for the terminal to complete the process of receiving and configuring a control signaling in the corresponding slot due to the following reasons.

1: Although the configuration of search complexity, such as the number of PDCCH candidates and the number of CCEs, may be further reduced with the increase of SCS, the time required for each scheduling information to be transmitted between different devices cannot be reduced, and the decrease in search complexity, such as decrease in the number of CCEs and the decrease in the number of PDCCH candidates to be monitored, will reduce the flexibility of base station scheduling.

2: Although parallelism can be improved by increasing the computing resources of the control channels, this will increase the implementation cost of the terminal, for example, corresponding to the device with SCS<=120 KHz.

Therefore, the traditional method of defining the monitoring capability of the control channel in units of slot cannot meet the needs of the development of wireless communication.

In view of the above problems, an embodiment of the present disclosure provides a method and a device for monitoring control channels, a terminal, a base station and a storage medium, to meet the needs of the development of wireless communication.

The method and the device for monitoring the control channel, the terminal, the base station and the storage medium according to the embodiments of the present disclosure can be applied to a wireless communication system or a wireless and wired system, which includes, but not limited to, 5G systems (such as NR systems), 6G systems, satellite systems, car networking systems, long term evolution (LTE) systems, subsequent evolution communication systems of the above systems and the like.

The base station according to embodiments of the present disclosure may include, but not limited to, one or more of the following: a commonly used base station, an evolved node base station (eNB), a network-side device in a 5G system (for example, a next-generation base station (gNB), transmission and reception point (TRP)) or other equipment.

The terminal according to embodiments of the present disclosure may be referred to as user equipment (UE). UE includes, but not limited to, handheld devices and vehicle-mounted devices. For example, it may be a mobile phone, a tablet computer, a notebook computer, an ultra-mobile personal computer (UMPC), a netbook, or a personal digital assistant (PDA), etc.

The following description will be given through specific embodiments.

FIG. 1 is a flowchart of a method for monitoring control channels according to embodiments of the present disclosure, and the method for monitoring the control channel can be performed by a terminal. As shown in FIG. 1, the method for monitoring the control channels may include the following steps:

Step 110, determining a monitoring slot group for control channel monitoring, and the monitoring slot group is used for characterizing a slot group capable of sharing control channel monitoring capability under a specified slot condition. The sharing control channel monitoring capability may refer to that the control channel monitoring capability is based on a slot group, for example, more than one slots correspond to one control channel monitoring capability.

In an embodiment, control channel monitoring can be used in a traditional Uu interface; and it can also be used in a side link, i.e. direct link.

The monitoring slot group may refer to a slot group consisting of more than one slots, and these slots share one control channel monitoring capability under a specified slot condition.

For example, the control channel is PDCCH; the monitoring slot group for PDCCH monitoring includes more than one slots, and these slots share a PDCCH monitoring capability under a specified slot condition.

The specified slot condition may be a specific value or a value range of the SCS set according to the actual situation. For example, the specified slot condition is that the SCS is 120 KHz; or the specified slot condition is that the SCS is greater than 120 KHz.

Step 120, determining a search space of the monitoring slot group.

For example, the search space may refer to the time range in which the control channel monitoring capability is configured in the monitoring slot group, which is the time range in which the terminal needs to monitor control channels, and the time range in which the base station needs to transmit the control channels. In addition, the search space in which the terminal needs to monitor the control channels and the search space in which the base station needs to transmit the control channel are the same, which can reduce the implementation complexity of the terminal.

The type of the search space may be CSS or USS. The number of search spaces can be one or more.

For example, SCS is 480 KHz; 4 slots form a monitoring slot group; the number of search spaces is 1; the search space is configured in slot 1 in the monitoring slot group; and no search space is configured in the other slots in the monitoring slot group.

For another example, SCS is 960 KHz; 8 slots form a monitoring slot group; the number of search spaces is 2 which are respectively configured in slot 0 and slot 4.

Step 130, monitoring the control channels indicated by the search space.

For example, when the base station transmits control information on the control channel, it only transmits the control information indicated by the search space configured with the control channel monitoring capability in the monitoring slot group, and then the terminal can only monitor the control channels indicated by the search space configured with the control channel monitoring capability.

For example, when the base station transmits DCI on the PDCCH, the DCI is transmitted only on the slot 0 configured with the PDCCH monitoring capability in the monitoring slot group. Each DCI can schedule up to 4 PDSCH data or 4 PUSCH data. Correspondingly, the terminal only monitors the PDCCH on the slot 0 configured with the PDCCH monitoring capability within the slot group, and configures and receives PDSCH or transmits PUSCH according to the monitored DCI. When the PDSCH is received, corresponding demodulation and decoding are required at the same time.

It can be seen from the above embodiments that by determining the monitoring slot group for control channel monitoring, where the monitoring slot group is used for characterizing a slot group capable of sharing control channel monitoring capability under a specified slot condition, determining search space of the monitoring slot group, and monitoring control channels indicated by the search space, control channels are monitored in a unit of a monitoring slot group, the problem that a terminal is unable to complete the process of receiving and configuring a control signaling in the corresponding slot due to the increase in the SCS is avoided, and the complexity of the terminal to monitor the control channels is also reduced.

Further, on the basis of the above methods, the specified slot condition in the above step 110 may include that the SCS is greater than 120 KHz; the sharing control channel monitoring capability is used for characterizing one control channel monitoring capability corresponding to more than one slots.

In an embodiment, since only the number of PDCCH candidates to be monitored by the terminal in each slot with an SCS below 120 KHz is defined in the current standard, for the case where the SCS is greater than 120 KHz, a slot group can be used as a unit, for example, more than one slots correspond to or share a same control channel monitoring capability, and the search space can be configured to realize the corresponding control channel monitoring.

The corresponding or sharing control channel monitoring capability may refer to more than one slots in the same slot group correspond to a same control channel monitoring capability. For example, the control channel is PDCCH, the monitoring slot group for PDCCH monitoring includes more than one slots, and these slots correspond to a same PDCCH monitoring capability under a specified slot condition.

It can be seen from the above embodiments that when the SCS is greater than 120 KHz, the control channels monitoring may be monitored in units of monitoring slot groups, that is, more than one slots correspond to a control channel monitoring capability, to avoid the problem that a terminal is unable to complete the process of receiving and configuring a control signaling in the corresponding slot due to the increase in the SCS, which meets the requirements of the development of wireless communication.

Further, on the basis of the above methods, determining the monitoring slot group for control channel monitoring is determined in step 110 may include the following steps (1-1-1) or (1-1-2).

In (1-1-1), first configuration information for the monitoring slot group is determined according to an interface protocol between a first node and a second node, and the monitoring slot group is determined according to the first configuration information.

In an embodiment, the first node may be a base station, and the second node may be a terminal; or the first node may be a terminal, and the second node may be a base station.

That is, the first configuration information for the monitoring slot group is determined according to the interface protocol between the base station and the terminal.

In (1-1-2), the first configuration information indicated by a base station is received, and the monitoring slot group is determined according to the first configuration information.

In an embodiment, the first configuration information can be transmitted to the terminal by the base station through higher layer signaling, and then the first configuration information can be received by the terminal through higher layer signaling.

It can be seen from the above embodiments that the first configuration information for the monitoring slot group can be determined according to the interface protocol between the first node and the second node, and the monitoring slot group can be determined according to the first configuration information; or the first configuration information indicated by the base station can also be received, and the monitoring slot group can be determined according to the first configuration information, to enrich the acquisition method of the first configuration information, to improve the reliability of determining the monitoring slot group.

Further, on the basis of the above methods, the first configuration information in the above (1-1-1) or (1-1-2) may include:

a number of slots included in the monitoring slot group;

a maximum number of control channel candidates in the monitoring slot group; or a maximum number of CCEs in the monitoring slot group.

The number of slots is associated with the SCS, for example, if the SCS is 480 KHz, the number of slots is 4, and if the SCS is 960 KHz, the number of slots is 8. This is only for illustration, and the relationship between the number of slots and the SCS can be set based on requirements.

In an embodiment, the number of slots included in the monitoring slot group may be directly configured, for example, the number of slots is 5 or 4. In addition, the number of slots may be determined based on the ratio of the SCS to a preset reference SCS, which can be multiplied with a specific SCS as a reference by the following formula:

$$K_\mu = k_0 * 2^{\mu - \mu_r};$$

where, $\mu_r$ is the reference SCS and $k_0$ is an expansion factor. The expansion factor can be 1, 2, or other values. For example, the number of slots may be expanded by taking the length of 0.125 ms (SCS=120 KHz) as a reference ($\mu_r$=3) in multiples. For another example, when SCS=480 KHz, the number of slots is $K_{\mu=5} = 1 * 2^{5-3} = 4$.

The maximum number of control channel candidates is associated with SCS. For example, when SCS=480 KHz, the maximum number of control channel candidates is M2, and when SCS=960 KHz, the maximum number of control channel candidates is M3, and M3>M2. This is only for illustration, and the relationship between the maximum number of control channel candidates and the SCS can be set based on requirements.

Referring to the above maximum number of control channel candidates, if the control channel is PDCCH, the maximum number of control channel candidates is the maximum number of PDCCH candidates, which can be as $M_{PDCCH}^{max,slot,\mu}$ shown in table 4. The configuration of the maximum number of PDCCH candidates depends on the capability for the terminal.

TABLE 4

| $\mu$ | $M_{PDCCH}^{max, slot, \mu}$ | shared slot number | remark |
| --- | --- | --- | --- |
| 4 | M1 | 2 | SCS = 240 KHz |
| 5 | M2 | 4 | SCS = 480 KHz |
| 6 | M3 | 8 | SCS = 960 KHz |
| 7 | M4 | 16 | SCS = 1920 KHz |

Where, $\mu$ is the factor or index value for calculating SCS, i.e. SCS=$2^\mu \times 15$ KHz. For example, if $\mu$ is 4, SCS is 240 KHz.

When the SCS is 240 KHz, the shared slot number is 2, and the maximum number of PDCCH candidates is M1. When SCS is 480 KHz, the shared slot number is 4, and the maximum number of PDCCH candidates is M2. When SCS is 960 KHz, the shared slot number is 8, and the maximum number of PDCCH candidates is M3. When SCS is 1920 KHz, the shared slot number is 16, and the maximum number of PDCCH candidates is M4. M1/M2/M3/M4 are all integers, and M1<=M2<=M3<=M4. For example, M1=20, M2=22, M3=36, M4=44.

The maximum number of CCEs is associated with SCS. For example, when SCS=480 KHz, the maximum number of CCEs is C2, and when SCS=960 KHz, the maximum number of CCEs is C3, and C3>, C2. This is only an example, and the association between the maximum number of CCEs and the SCS may be set based on requirements.

The above maximum number of CCEs can be as $C_{PDCCH}^{max,slot,\mu}$ shown in table 5. The configuration of the maximum number of CCEs also depends on the capability for the terminal.

TABLE 5

| $\mu$ | $C_{PDCCH}^{max, slot, \mu}$ | shared slot number | remark |
|---|---|---|---|
| 4 | C1 | 2 | SCS = 240 KHz |
| 5 | C2 | 4 | SCS = 480 KHz |
| 6 | C3 | 8 | SCS = 960 KHz |
| 7 | C4 | 16 | SCS = 1920 KHz |

When the SCS is 240 KHz, the shared slot number is 2, and the maximum number of CCEs is C1. When SCS is 480 KHz, the shared slot number is 4, and the maximum number of CCEs is C2. When SCS is 960 KHz, the shared slot number is 8, and the maximum number of CCEs is C3. When SCS is 1920 KHz, the shared slot number is 16, and the maximum number of CCEs is C4. C1/C2/C3/C4 are all integers, and C1<=C2<=C3<=C4. For example, C1=32, C2=48, C3=56, C4=56.

It can be seen from the above embodiments that the monitoring slot group can be determined according to the number of slots, the maximum number of control channel candidates, and the maximum number of CCEs in the first configuration information, to improve the accuracy of determining the monitoring slot group.

Correspondingly, the monitoring control channels indicated by the search space in step 130 may include the following step:

(1-2-1), monitoring the control channels indicated by the search space when a number of control channels to be monitored is not greater than the maximum number of control channel candidates.

In an embodiment, when the base station transmits the control channel, it should be ensured that the number of control channels to be transmitted is within the range of a "the maximum number of control channel candidates"; and correspondingly, when the control channels are monitored by the terminal, the control channel monitoring is only performed within the range of the "maximum number of control channel candidates".

For example, if the maximum number of control channel candidates is 20, the number of control channel to be monitored is less than or equal to 20.

It can be seen from the above embodiments that, the control channels indicated by the search space are monitored when a number of control channels to be monitored is not greater than the maximum number of control channel candidates, to ensure that the control channel are monitored within the capability for the terminal, and reliability of the control channel monitoring is improved.

Further, on the basis of the above methods, determining the search space of the monitoring slot group in step 120 may include (1-3-1) or (1-3-2).

In (1-3-1), second configuration information for the search space is determined according to an interface protocol between a first node and a second node, and the search space is determined according to the second configuration information.

In an embodiment, the first node may be a base station, and the second node may be a terminal; or the first node may be a terminal, and the second node may be a base station. That is, the second configuration information for the search space is determined according to the interface protocol between the base station and the terminal.

In (1-3-2), the second configuration information indicated by a base station is received, and the search space is determined according to the second configuration information.

In an embodiment, the second configuration information can be transmitted to the terminal by the base station through higher layer signaling, and then the second configuration information can be received by the terminal through higher layer signaling.

It can be seen from the above embodiments that second configuration information for the search space is determined according to an interface protocol between a first node and a second node, and the search space is determined according to the second configuration information; or the second configuration information indicated by a base station is received, and the search space is determined according to the second configuration information, to enrich the acquisition method of the second configuration information, and then to improve the reliability of determining the search space.

Further, on the basis of the above methods, the second configuration information in the above (1-3-1) or (1-3-2) may include:

first indication information, used for indicating a monitoring slot group with a control channel monitoring occasion; and second indication information, used for indicating that the control channel monitoring occasion is at a designated position in the monitoring slot group, where the designated position includes one designated slot or a plurality of designated slots in the monitoring slot group. The plurality of designated slots may refer to at least two slots, for example, slot 0 and slot 3 in the monitoring slot group.

In an embodiment, the above-mentioned first indication information may indicate the slot groups with a monitoring occasion for control channel. When a slot group is configured with a monitoring occasion, control channels are monitored in this slot group by the terminal. Otherwise, there is no need to monitor the control channels in this slot group.

For example: {0, 1, 2, 3} is a slot group with a control channel monitoring occasion; and {8, 9, 10, 11} is another slot group without a control channel monitoring occasion.

The monitoring slot group with a control channel monitoring occasion may be indicated by the following two configuration ways.

A first way is to use a bitmap.

For example, a value of 80 bit is used for indicating a configuration of 10 ms (a slot group is 0.125 ms, and 10 ms contains 80 slot groups), 1 means that PDCCHs need to be monitored in the corresponding slot group, 0 means that PDCCHs do not need to be monitored in the corresponding slot group.

A second way is to use a periodic manner whose configuration parameters include: slot group period, and slot group offset.

For example, the search space based on slot group is configured by the base station through higher layer signaling, and 4 slots form a group (SCS=480 KHz, and the length of each slot is 0.125/4 ms). In higher layer signaling configuration, the period of the search space is 4 slot groups (SG), and the offset is 2 SGs. When the PDCCH is monitored by the terminal, the terminal monitors PDCCHs only on a SG with a period of 4 SGs and an offset of 2 SGs.

The position of the control channel monitoring occasion at the monitoring slot group may refer to the position of the slot and the symbol where the control channel monitoring occasion is configured.

For example, {0, 1, 2, 3} is a slot group, where a control channel monitoring occasion is at slot 0.

In an embodiment, the second configuration information may include: an offset of start position of the monitoring slot group, and the offset of start position is used for indicating respective slots included in the monitoring slot group.

In an embodiment, the offset of start position is used for indicating which slots a slot group consists of.

When the offset of start position is 0 and the number of slots within the slot group is 4, the serial numbers of slots included within the slot group are {4n, 4n+1, 4n+2, 4n+3}. Where n is an integer greater than or equal to 0. For example, {0, 1, 2, 3} is a slot group, {8, 9, 10, 11} is another slot group.

When the offset of start position is 2 and the number of slots within the slot group is 4, the serial numbers of slots included within the slot group are {4n+2, 4n+1+2, 4n+2+2, 4n+3+2}. Where n is an integer greater than or equal to 0. For example, {2, 3, 4, 5} is a slot group, {10, 11, 12, 13} is another slot group.

The offset of start position may be transmitted to the terminal by the base station through higher layer signaling. When the base station transmits the control channels, it is ensured that the control channels are transmitted in the time domain "within the configured search space". Correspondingly, the control channels are monitored only in the configured time domain by the terminal.

In addition, if the offset of start position is always 0, it can be used as a default setting without indication.

Correspondingly, when monitoring control channels indicated by the search space in step 130, it may include the following step.

In (1-4-1), the control channels are monitored at one designated slot or a plurality of designated slots in the monitoring slot group.

In an embodiment, the position where the control channel monitoring occasion is at the monitoring slot group may refer to the position of the slot and the symbol where the control channel monitoring occasion is configured.

For example, {0, 1, 2, 3} is a slot group where a control channel monitoring occasion is at slot 0, and the control channels can only be monitored at slot 0 by the terminal.

For another example, {0, 1, 2, 3} is a slot group where the control channel monitoring occasions are at slot 0 and slot 3, and the control channels can be monitored at slot 0 and slot 3 by the terminal.

It can be seen from the above embodiments that the control channel monitoring can be performed at the position where the control channel monitoring occasion is located in the monitoring slot group, to improve the efficiency of the control channel monitoring.

Further, on the basis of the above methods, after step 130, it may further include the following step (1-5-1).

In (1-5-1), a shared data channel is received or transmitted according to one or more monitored control information after the control channel monitoring within all search spaces in the monitoring slot group has been completed. Correspondingly, the transmitting or receiving time is calculated according to the end time of the last search space. For example, the preparation time required by data transmission is N2 (having a unit of a symbol or time), and the end time of the CORESET of the last search space within the slot group is t2, and then the terminal is not required to be capable of transmitting data before t2+N2. Similarly, the time requirement for the completion of data reception is N1 (whose unit is symbol or time), and the end time of the CORESET of the last search space within the slot group is t2, and then the terminal is not required to be capable of feeding back the decoding result of the received data before t2+N1.

In an embodiment, control channel monitoring can be used in a traditional Uu interface; it can also be used in a side link, i.e., direct link. The control information corresponding to the Uu interface is DCI; the control information corresponding to the side link is sidelink control information (SCI).

For example, PDSCH is received according to the monitored one or more DCIs after the PDCCH monitoring within all search spaces in the monitoring slot group has been completed. The PDCCH is used to transmit DCI control information.

For another example, the physical sidelink shared channel (PSSCH) is received according to the monitored one or more SCIs after the PSCCH monitoring within all search spaces in the monitoring slot group has been completed. The PSCCH is used to transmit SCI control information.

In the above embodiments, by receiving or transmitting the shared data channel according to the one or more monitored control information after the control channel monitoring within all search spaces in the monitoring slot group has been completed, the complexity of receiving or transmitting the shared data channel is reduced.

Figure 2:
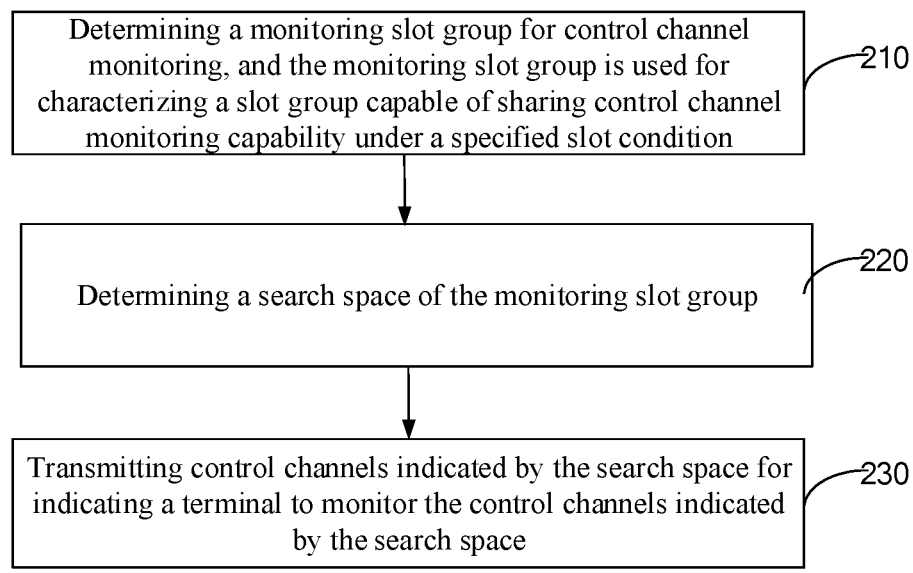
FIG. 2 is a flowchart of a method for monitoring control channels according to embodiments of the present disclosure.

FIG. 2 is a flowchart of a method for monitoring control channels according to embodiments of the present disclosure, and the method can be performed by a base station.

As shown in FIG. 2, the method for monitoring the control channels may include the following steps.

Step 210, determining a monitoring slot group for control channel monitoring, and the monitoring slot group is used for characterizing a slot group capable of sharing control channel monitoring capability under a specified slot condition.

In an embodiment, control channel monitoring can be used in a traditional Uu interface; and it can also be used in a side link, i.e., direct link.

The monitoring slot group may refer to a slot group consisting of more than one slots, and these slots share control channel monitoring capability under a specified slot condition.

For example, the control channel is PDCCH; the monitoring slot group for PDCCH monitoring includes more than one slots, and these slots share a PDCCH monitoring capability under a specified slot condition.

The specified slot condition may be a specific value or a value range of the SCS set according to the actual situation. For example, the specified slot condition is that the SCS is 120 KHz; or the specified slot condition is that the SCS is greater than 120 KHz.

Step 220, determining a search space of the monitoring slot group.

For example, the search space may refer to the time range in which the control channel monitoring capability is configured in the monitoring slot group, and is the time range in which the terminal needs to monitor the control channels, and the time range in which the base station needs to transmit the control channel. In addition, the search space in which the terminal needs to monitor the control channels and the search space in which the base station needs to transmit the control channel are the same, which can reduce the implementation complexity of the terminal.

The type of the search space may be CSS or USS. The number of search spaces can be one or more.

For example, SCS is 480 KHz; 4 slots form a monitoring slot group; the number of search spaces is 1; the search space is configured in slot 2 in the monitoring slot group; and no search space is configured in the other slots in the monitoring slot group.

For another example, SCS is 960 KHz; 8 slots form a monitoring slot group; the number of search spaces is 2 which are respectively configured in slot 0 and slot 4.

Step 230, transmitting control channels indicated by the search space for indicating a terminal to monitor the control channels indicated by the search space.

For example, when the base station transmits control information on the control channel, it only transmits the control information indicated by the search space configured with the control channel monitoring capability in the monitoring slot group, and then the terminal can only perform control channel monitoring indicated by the search space configured with the control channel monitoring capability.

For example, when the base station transmits DCI on the PDCCH, the DCI is transmitted only on the slot 0 configured with the PDCCH monitoring capability in the monitoring slot group. Each DCI can schedule up to 4 PDSCH data. Correspondingly, the terminal only monitors the PDCCH on the slot 0 configured with the PDCCH monitoring capability within the slot group, and configures, receives, demodulates and decodes PDSCH according to the monitored DCI.

It can be seen from the above embodiments that by determining the monitoring slot group for control channel monitoring, where the monitoring slot group is used for characterizing a slot group capable of sharing control channel monitoring capability under a specified slot condition, determining search space of the monitoring slot group, and transmitting control channels indicated by the search space for indicating a terminal to monitor the control channels indicated by the search space, control channels are monitored in a unit of a monitoring slot group performed by the terminal, and the problem that a terminal is unable to complete the process of receiving and configuring a control signaling in the corresponding slot due to the increase in the SCS is avoided, especially the monitoring capability for a slot group is integrated in the search space of the slot group, which improves the scheduling flexibility of the base station.

Further, on the basis of the above methods, the specified slot condition in the above step 210 may include that the SCS is greater than 120 KHz; the sharing control channel monitoring capability is used for characterizing one control channel monitoring capability corresponding to more than one slots.

In an embodiment, since only the number of PDCCH candidates to be monitored by the terminal in each slot with an SCS below 120 KHz is defined in the current standard, for the case where the SCS is greater than 120 KHz, a slot group can be used as a unit, for example, more than one slots correspond to or share a same control channel monitoring capability, and the search space can be configured to realize the corresponding control channel monitoring.

The corresponding or sharing a control channel monitoring capability may refer to more than one slots in the same slot group sharing a same control channel monitoring capability. For example, the control channel is PDCCH, the monitoring slot group for PDCCH monitoring includes more than one slots, and these slots correspond to a same PDCCH monitoring capability under a specified slot condition.

It can be seen from the above embodiments that when the SCS is greater than 120 KHz, the control channel may be monitored in units of monitoring slot groups, that is, more than one slots correspond to a control channel monitoring capability, to avoid the problem that a terminal is unable to complete the process of receiving and configuring a control signaling in the corresponding slot due to the increase in the SCS, which meets the requirements of the development of wireless communication.

Further, on the basis of the above methods, determining the monitoring slot group for control channel monitoring in step 210 may include the following steps (2-1-1) or (2-1-2).

In (2-1-1), first configuration information for the monitoring slot group is determined according to an interface protocol between a first node and a second node.

In an embodiment, the first node may be a base station, and the second node may be a terminal; or the first node may be a terminal, and the second node may be a base station.

That is, the first configuration information for the monitoring slot group is determined according to the interface protocol between the base station and the terminal.

In (2-1-2), the monitoring slot group is determined according to the first configuration information.

It can be seen from the above embodiments that the first configuration information for the monitoring slot group can be determined according to the interface protocol between the first node and the second node, and the monitoring slot group can be determined according to the first configuration information, to improve the reliability of determining the monitoring slot group.

Further, on the basis of the above methods, the first configuration information in the above (2-1-1) may include:
 a number of slots included in the monitoring slot group;
 a maximum number of control channel candidates in the monitoring slot group; or
 a maximum number of control channel elements (CCEs) in the monitoring slot group.

Herein, it further includes at least one of the number of slots is associated with the SCS;
 the maximum number of control channel candidates is associated with the SCS; and the maximum number of CCEs is associated with the SCS.

In an embodiment, if the SCS is 480 KHz, the number of slots is 4; and if the SCS is 960 KHz, the number of slots is 8.

In an embodiment, the number of slots included in the monitoring slot group may be directly configured, for example, the number of slots is 5 or 4. In addition, the number of slots is determined based on the ratio of the SCS to a preset reference SCS, which can be multiplied with a specific SCS as a reference by the following formula:

$$K_\mu = k_0 * 2^{\mu - \mu_r};$$

where, $\mu_r$ is the reference SCS and $k_0$ is an expansion factor. The expansion factor can be 1, 2, or other values. For example, the number of slots may be expanded by taking the length of 0.125 ms (SCS=120 KHz) as a reference ($\mu_r = 3$) in multiples. For another example, when SCS=480 KHz, the number of slots is $K_{\mu=6} = 1 * 2^{6-3} = 8$.

Referring to the above maximum number of control channel candidates, if the control channel is PDCCH, the maximum number of control channel candidates is the maximum number of PDCCH candidates, which is as $M_{PDCCH}^{max,slot,\mu}$ showed in the above table 4. The configuration of the maximum number of PDCCH candidates depends on the capability of the terminal.

Referring to the above maximum number of CCEs, the maximum number of CCEs is as $C_{PDCCH}^{max,slot,\mu}$ shown in the above table 5. The configuration of the maximum number of CCEs also depends on the capability of the terminal.

It can be seen from the above embodiments that the monitoring slot group can be determined according to the number of slots, the maximum number of control channel candidates, and the maximum number of CCEs in the first configuration information, to improve the accuracy of determining the monitoring slot group.

Further, on the basis of the above methods, determining the search space of the monitoring slot group in step 220 may include the following steps (2-2-1) or (2-2-2).

In (2-2-1), second configuration information for the search space is determined according to an interface protocol between a first node and a second node.

In an embodiment, the first node may be a base station, and the second node may be a terminal; or the first node may be a terminal, and the second node may be a base station.

That is, the second configuration information for the search space is determined according to the interface protocol between the base station and the terminal.

In (2-2-2), the search space is determined according to the second configuration information.

It can be seen from the above embodiments that the second configuration information for the search space is determined according to the interface protocol between the first node and the second node, and the search space is determined according to the second configuration information, to improve the reliability of determining the search space.

Further, on the basis of the above methods, the second configuration information in the above (2-2-1) may include:

first indication information, used for indicating a monitoring slot group with a control channel monitoring occasion; and second indication information, used for indicating that the control channel monitoring occasion is at a designated position in the monitoring slot group, where the designated position includes one designated slot or a plurality of designated slots in the monitoring slot group. The plurality of designated slots may refer to at least two slots, for example, slot 0 and slot 3 in the monitoring slot group.

In an embodiment, the above-mentioned first indication information may indicate the slot groups with a monitoring occasion for control channel. When a slot group is configured with a monitoring occasion, the control channels are monitored in this slot group by the terminal. Otherwise, there is no need to monitor the control channels in this slot group.

For example, {0, 1, 2, 3} is a slot group with a control channel monitoring occasion; and {8, 9, 10, 11} is another slot group without a control channel monitoring occasion.

The monitoring slot group with a control channel monitoring occasion may be indicated by the following two configuration ways.

A first way is to use a bitmap.

For example, a value of 80 bit is used for indicating a configuration of 10 ms (a slot group is 0.125 ms, and 10 ms contains 80 slot groups), 1 means that PDCCHs need to be monitored in the corresponding slot group, 0 means that PDCCHs do not need to be monitored in the corresponding slot group.

A second way is to use a periodic manner whose configuration parameters include: slot group period, and slot group offset.

For example, the search space based on the slot group is configured by the base station through higher layer signaling, and 4 slots form a group (SCS=480 KHz, and the length of each slot is 0.125/4 ms). In higher layer signaling configuration, the period of the search space is 4 slot groups (Slot Group, SG), and the offset is 2 SGs. When the PDCCH is monitored by the terminal, the terminal monitors PDCCHs only on a SG with a period of 4 SGs and an offset of 2 SGs.

The position of the control channel monitoring occasion at the monitoring slot group may refer to the position of the slot and the symbol where the control channel monitoring occasion is configured.

For example, {0, 1, 2, 3} is a slot group, where a control channel monitoring occasion is at slot 0.

In an embodiment, the second configuration information may include: an offset of start position of the monitoring slot group, and the offset of start position is used for indicating respective slots included in the monitoring slot group.

In an embodiment, the offset of start position is used for indicating which slots a slot group consists of.

When the offset of start position is 0 and the number of slots within the slot group is 4, the serial numbers of slots included within the slot group are {4n, 4n+1, 4n+2, 4n+3}.

Where n is an integer greater than or equal to 0. For example, {0, 1, 2, 3} is a slot group, {8, 9, 10, 11} is another slot group.

When the offset of start position is 2 and the number of slots within the slot group is 4, the serial numbers of slots included within the slot group are {4n+2, 4n+1+2, 4n+2+2, 4n+3+2}. Where n is an integer greater than or equal to 0. For example, {2, 3, 4, 5} is a slot group, {10, 11, 12, 13} is another slot group.

The offset of start position may be transmitted to the terminal by the base station through higher layer signaling. When the base station transmits the control channel, it is ensured that the control channel is transmitted in the time domain "within the configured search space". Correspondingly, control channel monitoring is only performed in the configured time domain by the terminal.

In addition, if the offset of start position is always 0, it can be used as a default setting without indication.

Further, on the basis of the above methods, transmitting the control channels indicated by the search space in step 230 may include: transmitting the control channel on one designated slot or a plurality of designated slots in the monitoring slot group.

For example, {0, 1, 2, 3} is a slot group, where a control channel monitoring occasion is at slot 0, and the control channel can only be transmitted on slot 0 by the base station.

For another example, {0, 1, 2, 3} is a slot group, where the control channel monitoring occasions are at slot 0 and slot 3, and the control channel can be transmitted on slot 0 and slot 3 by the base station.

Further, on the basis of the above methods, transmitting the control channels indicated by the search space in step 230 may include the following step (2-3-1).

In (2-3-1), control information is transmitted within one or more search spaces in the monitoring slot group for indicating the terminal to receive or transmit a shared data channel according to the one or more monitored control information after the control channel monitoring within all search spaces in the monitoring slot group has been completed.

In an embodiment, control channel monitoring can be used in a traditional Uu interface; it can also be used in a side link. The control information corresponding to the Uu interface is DCI; the control information corresponding to the side link is SCI.

For example, DCI is transmitted within one or more search spaces in the monitoring slot group by the base station, and then the reception of the PDSCH can be performed according to the monitored one or more DCIs after the PDCCH monitoring within all search spaces in the monitoring slot group has been completed. The PDCCH is used to transmit DCI control information.

Another example, SCI is transmitted within one or more search spaces in the monitoring slot group by the base station, and then PSSCH can be received according to the monitored one or more SCIs after the PSCCH monitoring within all search spaces in the monitoring slot group has been completed. The PSCCH is used to transmit SCI control information.

It can be seen from the above embodiments that control information can be transmitted within one or more search spaces in the monitoring slot group for indicating the terminal to receive or transmit the shared data channel according to the one or more monitored control information after the control channel monitoring within all search spaces in the monitoring slot group has been completed, and the scheduling flexibility of the base station is further improved.

The method for control channel monitoring shown in FIG. 1 and FIG. 2 will be described below with a specific example.

Example 1: SCS is 480 KHz, 4 slots form one slot group, a search space is configured in one slot, and its position is at the first slot.

First, the slot group of sharing PDCCH monitoring capability in case that slot SCS=480 KHz is configured.

The configuration of the slot group of sharing PDCCH monitoring capability includes the configuration of the maximum number of PDCCH candidates to be monitored and/or the configuration of the maximum number of CCEs.

The number of slots included in each slot group can be configured in two ways.

A first way is to directly configure the number of slots included in a slot group.

For example, the number of slots is 5 or 4.

A second way is to expand the number of slots by taking a specific SCS as a reference in multiples by the following formula:

$$K_\mu = k_0 * 2^{\mu - \mu_r};$$

where $\mu_r$ is the reference SCS.

For example, the length of 0.125 ms (SCS=120 KHz) is taken as a reference ($\mu_r=3$) to expand the number of slots in multiples.

For another example, when SCS=480 KHz, the number of slots is $K_{\mu=5} = 2^{5-3} = 4$.

The advantage of configuring the PDCCH monitoring capability in units of slot groups with reference to the length of a SCS is that the interaction timing requirements between architectures and modules can be considered in a unified manner during design.

The configuration of the maximum number of PDCCH candidates depends on the capability of the terminal, and still can take SCS=120 KHz as a capability baseline.

The configuration of the maximum number of CCEs also depends on the capability of the terminal, and still can take SCS=120 KHz as a capability baseline.

Second, the search space of the slot group of sharing PDCCH monitoring capability with slot SCS=480 KHz is configured.

The configuration of the search space includes: type of search space (USS or CSS); configuration of the slot group in which PDCCHs need to be monitored. The type of search space is indicated in configuration of the search space. The slot group in which PDCCHs need to be monitored may be configured by the following two ways.

A first way is to use a bitmap.

For example, a value of 80 bit is used for indicating a configuration of 10 ms (a slot group is 0.125 ms, and 10 ms contains 80 slot groups), 1 means that PDCCHs need to be monitored in the corresponding slot group, 0 means that PDCCHs do not need to be monitored in the corresponding slot group.

A second way is to use a periodic manner whose configuration parameters include: slot group period, and slot group offset.

Figure 3:
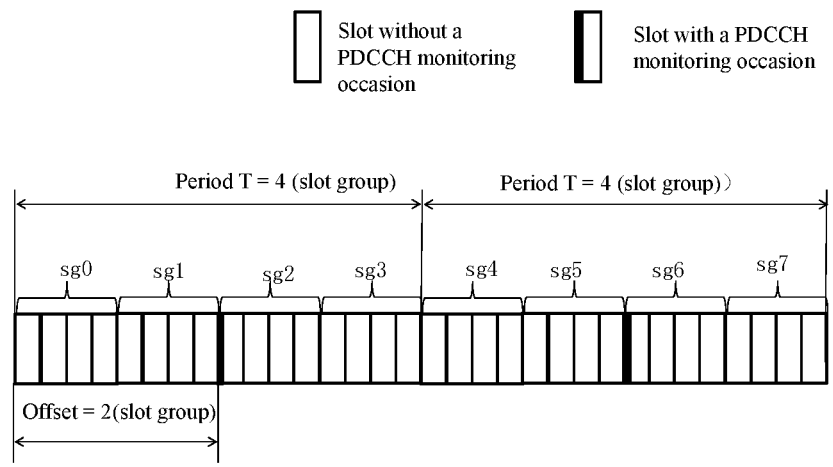
FIG. 3 is a schematic diagram of a configuration of search space according to embodiments of the present disclosure.

For example, as shown in FIG. 3, the search space based on slot group is configured by the base station through higher layer signaling, and 4 slots form a group (SCS=480 KHz, and the length of each slot is 0.125/4 ms). In higher layer signaling configuration, the period T of the search space is 4 slot groups (SG), and the offset is 2 SGs. When the PDCCH is monitored by the terminal, the terminal monitors PDCCHs only on a SG with a period of 4 SGs and an offset of 2 SGs. In the SG with a PDCCH monitoring occasion, the PDCCH monitoring occasion is at the first slot.

It can be seen from the above embodiments that determining the PDCCH monitoring capability by defining the slot group as a unit is beneficial to the design and implementation of the terminal side.

Example 2: SCS is 960 KHz, 8 slots form one group, the search spaces are configured in 2 slots, and its positions are respectively at slot 0 and slot 4.

First, the slot group of sharing PDCCH monitoring capability in case that slot SCS=960 KHz is configured.

The configuration of the slot group of sharing PDCCH monitoring capability includes the configuration of the maximum number of PDCCH candidates to be monitored and/or the configuration of the maximum number of CCEs.

The number of slots included in each slot group can be configured in two ways.

A first way is to directly configure the number of slots included in a slot group.

For example, the number of slots is 5 or 4.

A second way is to expand the number of slots by taking a specific SCS as a reference by the following formula:

$$K_\mu = k_0 * 2^{\mu - \mu_r};$$

where $\mu_r$ is the reference SCS and $k_0$ is an expansion factor. The expansion factor can be 1, 2, or other values.

For example, the length of 0.125 ms (SCS=120 KHz) is taken as a reference ($\mu_r=3$) to expand the number of slots in multiples.

For another example, when SCS=960 KHz, the number of slots is $K_{\mu=6} = 1 * 2^{6-3} = 8$.

The advantage of configuring the PDCCH monitoring capability in units of slot groups with reference to the length of a SCS is that the interaction timing requirements between architectures and modules can be considered in a unified manner during design.

The configuration of the maximum number of PDCCH candidates depends on the capability of the terminal, and still can take SCS=120 KHz as a capability baseline, or SCS=15 KHz can also be used as the capability baseline.

The configuration of the maximum number of CCEs also depends on the capability of the terminal, and still can take SCS=120 KHz as a capability baseline, or SCS=15 KHz can also be used as the capability baseline.

Second, the search space of the slot group of sharing PDCCH monitoring capability with slot SCS=960 KHz is configured.

1) The slot group in which PDCCHs need to be monitored may be configured by the following two ways.

A first way is to use a bitmap.

For example, a value of 80 bit is used for indicating a configuration of 10 ms (a slot group is 0.125 ms, and 10 ms contains 80 slot groups), 1 means that PDCCHs need to be monitored in the corresponding slot group, 0 means that PDCCHs do not need to be monitored in the corresponding slot group.

A second way is to use a periodic manner whose configuration parameters include: slot group period, and slot group offset.

For example, the search space based on the slot group is configured by the base station through higher layer signaling, and 4 slots form a group (SCS=480 KHz, and the length of each slot is 0.125/4 ms). In higher layer signaling configuration, the period of the search space is 4 slot groups (SG), and the offset is 2 SGs. When the PDCCH is monitored by the terminal, it is only performed on a SG with a period of 4 SGs and an offset of 2 SGs. In the SG with a PDCCH monitoring occasion, the PDCCH monitoring occasion is at the first slot.

2) The slot in which PDCCHs need to be monitored within the slot group may be configured by the following way:

monitoringslotWithinSlotgroupBITSTRING (SIZE (Ku))

Ku is the number or the maximum number of slots included within a slot group.

When the above string definition is defined as 1, it indicates that the corresponding slot has a PDCCH monitoring occasion; and if it is 0, it indicates that there is no monitoring occasion.

Figure 4:
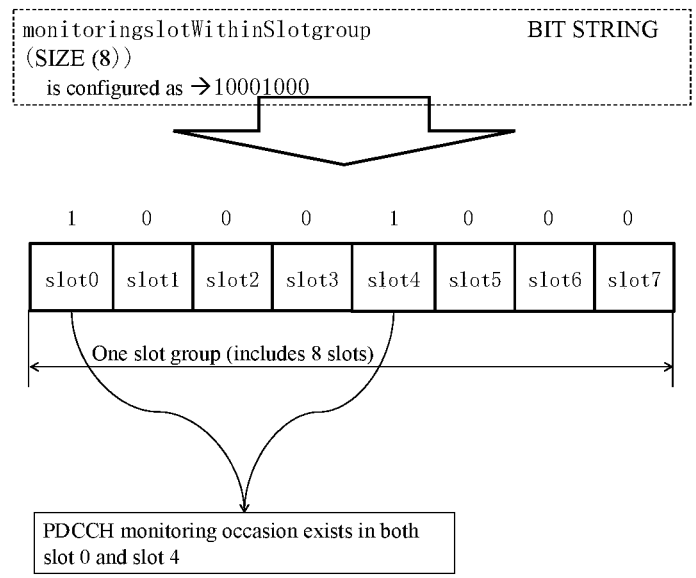
FIG. 4 is a schematic diagram of a PDCCH monitoring occasion within a slot group according to embodiments of the present disclosure.
Figure 5:
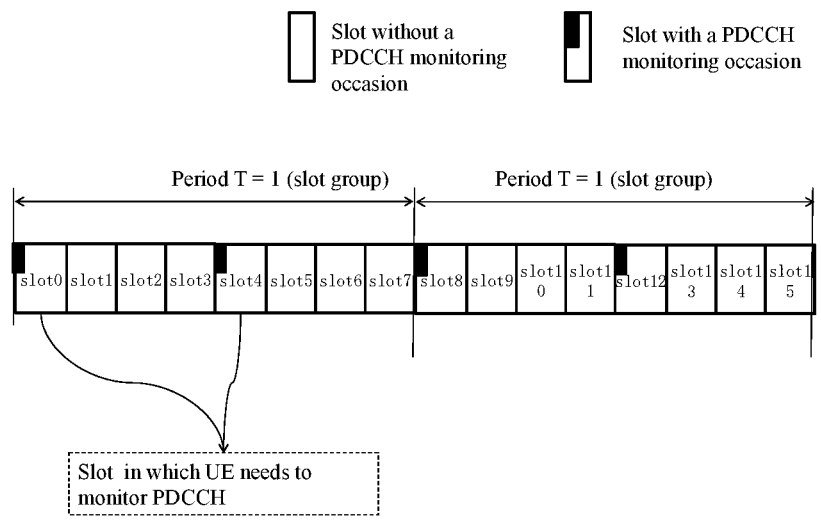
FIG. 5 is a schematic diagram of another configuration of search space according to embodiments of the present disclosure.

For example, as shown in FIG. 4 and FIG. 5, monitoringslotWithinSlotgroup is configured as 10001000, which indicates that in the SG consisting of 8 slots, PDCCH monitoring occasions exist in both slot 0 and slot 4. It can be seen from the above embodiments that determining the PDCCH monitoring capability by defining the slot group as a unit is beneficial to the design and implementation of the terminal side.

Example 3: schemes for assigning monitoring capability when multiple monitoring occasions are configured in a slot group.

In the above example 2, the case where there are two PDCCH monitoring occasions in one slot group is given. In actual configuration, a plurality of PDCCH monitoring occasions can be configured in one slot group. In this case, how to assign the number of control channel candidates and the number of CCEs should be determined in the standard protocol, and which may include the following step A and step B.

In step A, the number of control channel candidates and the number of CCEs required for the monitoring occasion is determined by the following ways.

Way 1: the number of PDCCH candidates is assigned averagely, and the number of CCEs is configured as the maximum number.

Way 2: the number of PDCCH candidates is assigned based on the capability reported by the terminal, and the number of CCEs is assigned based on the capability reported by the terminal.

Figure 6:
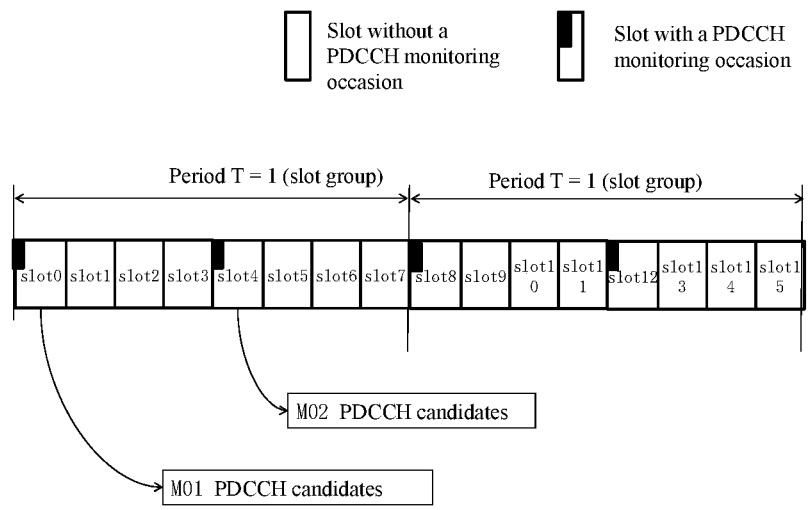
FIG. 6 is a schematic diagram of assigning the number of PDCCH candidates to be monitored according to embodiments of the present disclosure.

For example, as shown in FIG. 6, in the above example 2, the determined number of PDCCH candidates are M01 and M02. M01+M02 may be equal to the number of PDCCH candidates configured with one monitoring occasion, or may be greater than the number of PDCCH candidates configured with one monitoring occasion. It is not limited here.

In step B, the corresponding control channel candidate is assigned within the slot group.

It is assumed that in the configuration of a search space, the following parameters are configured in a slot group.

1: the number of PDCCH candidates.

For example, the number of PDCCH candidates is:

$$M_{PDCCH}^{group\_slot} = \sum_L M_L;$$

where $M_L$ is the number of PDCCH candidates corresponding to each CCE aggregation level.

Figure 7:
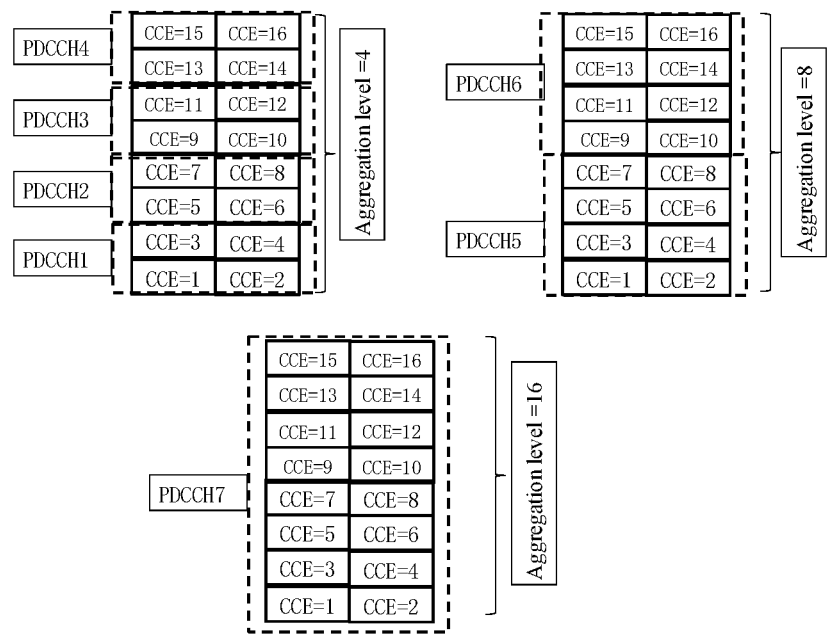
FIG. 7 is a schematic diagram of a CCE aggregation level and PDCCH candidates according to embodiments of the present disclosure.

For example, as shown in FIG. 7, when the CCE aggregation level is 4, the number of PDCCH candidates is 4, which are PDCCH1, PDCCH2, PDCCH3, and PDCCH4 respectively; when the CCE aggregation level is 8, the number of PDCCH candidates is 2, which are PDCCH5 and PDCCH6 respectively; and when the CCE aggregation level is 16, the number of PDCCH candidate is 1, for example, is PDCCH7. That is, the total number of PDCCH candidates is 7.

2: K candidate monitoring occasions; in the above example 2, K is 2.

The assigning scheme is described as follows.

1) The PDCCH candidates are numbered in the following order: first, the PDCCH candidates with the same CCE aggregation level are ordered in ascending order of the CCE indexes; then, the PDCCH candidates with different CCE aggregation levels are ordered in ascending order of the CCE aggregation levels, as shown in FIG. 7.

2) It is assumed that there is $M^{total}$ PDCCH monitoring occasions within the slot group. (For example, K=1 in example 1, and K=2 in example 2).

Then, the index of start PDCCH candidate per PDCCH monitoring occasion is:

$$M_0^{start} = 1$$

$$M_k^{start} = M_{k-1}^{start} + M_{0,(k-1)}, k >= 1$$

Figure 8:
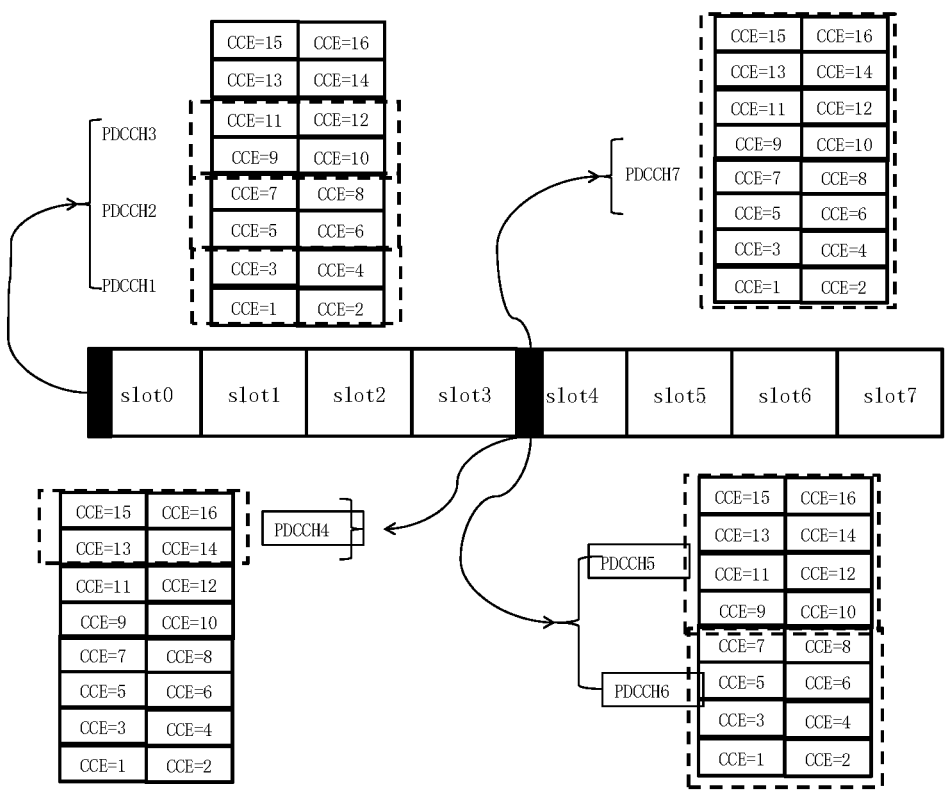
FIG. 8 is another schematic diagram of assigning the number of PDCCH candidates to be monitored according to embodiments of the present disclosure.

For example, as shown in FIG. 8, M01=3, M02=4, the assigned PDCCHs on two PDCCH monitoring occasions are respectively: slot 0={PDCCH1, PDCCH2, PDCCH3}, slot 4={PDCCH4, PDCCH5, PDCCH6, PDCCH7}. That is, in slot 0, the PDCCHs be monitored by the terminal are: PDCCH1 candidate, PDCCH2 and PDCCH3 candidates with a CCE aggregation level of 4; on slot 4, the PDCCHs to be monitored by the terminal are: PDCCH4 candidate with a CCE aggregation level of 4, PDCCH5 candidate and PDCCH6 with a CCE aggregation level of 8, and PDCCH7 candidate with a CCE aggregation level of 16.

It can be seen from the above embodiments that the allocation of different CCE aggregation levels in different PDCCH monitoring occasions makes the base station have a more flexible scheduling and can schedule more terminals and data packets.

In addition, in the above-mentioned embodiment:
1: the PDCCH candidates can be ordered in ascending order of CCE aggregation levels, or in descending order of CCE aggregation levels;
2: the PDCCH candidates can be ordered in ascending order of CCE aggregation levels, or in order of the size of the DCIs; for example, when two DCIs with different sizes exist, they can be assigned to different PDCCH monitoring occasions;
3: when a plurality of PDCCH monitoring occasions exist in a slot group, through a protocol the terminal and the base station then report to the DCI parsing module after all the monitoring occasions are monitored, for example, when calculating the slot or a timing, the symbol calculation of the last PDCCH monitoring occasion shall prevail.
4: In an embodiment, the PDCCH monitoring capability may be assigned in one search space, or may be assigned in different search spaces. For example, PDCCH candidates with a CCE aggregation level of 4 are monitored within search space S1; PDCCH candidates with CCE aggregation levels of 8 and 16 are monitored within search space S2.

Besides, in the above embodiment, there is a corresponding PDCCH monitoring capability in a slot group. Since the PDSCH/PUSCH that may be scheduled may be transmitted on the slot in this slot group, and may also be scheduled on other slot groups. In the scheduling signaling, the scheduling indication for the slot group is added in one DCI, and the method is as follows.

1: When the scheduling is PDSCH, the value of k0 (for example, if PUSCH is scheduled, the value of k2 is reused) is used for indicating the offset of the slot group (groupslot-offset), the slot offset within the slot group is shown in a way of bitmap.

Figure 9:
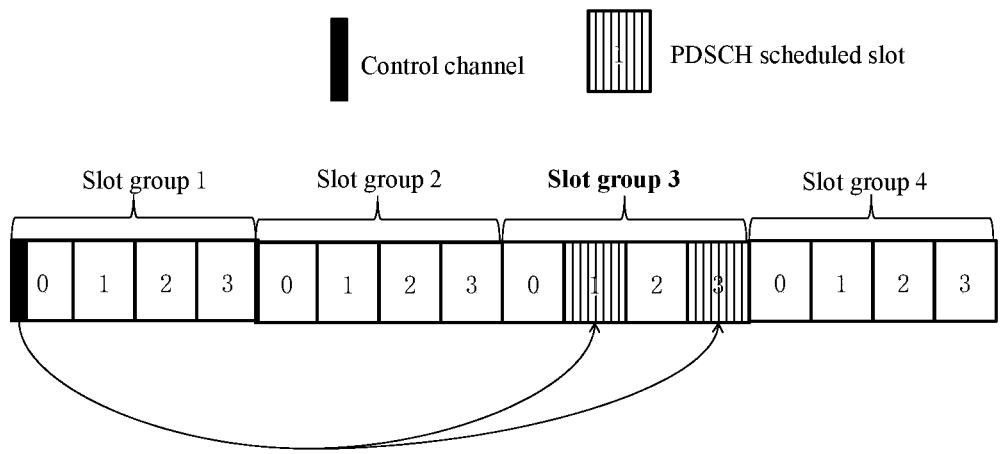
FIG. 9 is a schematic diagram showing indication of a slot group and a slot according to embodiments of the present disclosure.

For example, as shown in FIG. 9, the scheduling parameters are set as: k0, groupslot[$K_\mu$], where $K_\mu$ is related to the number of slots included within the slot group.

k0=2 indicates that the scheduling slot group is 1+k0=3;

The groupslot is 0101 indicates that in the scheduled slot group, no data scheduling exist in both slot 0 and slot 2 and data scheduling exists in slot 1 and slot 3.

Further, groupslot-offset information may be indicated in the DCI.

2: When the scheduling is PDSCH, an indication for the slot group is added, that is, groupslot-index. The numerical range of the slot group is limited, for example, it is limited to 0, 1, 2, 3, . . . , 16.

Figure 10:
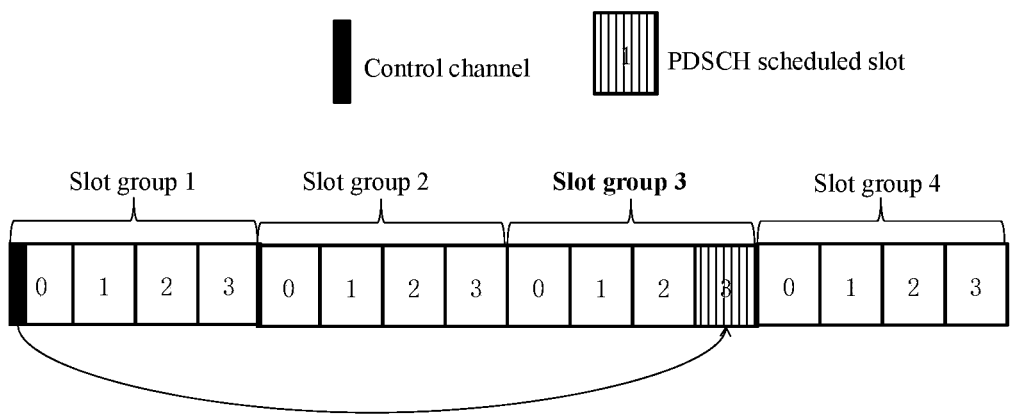
FIG. 10 is another schematic diagram showing indication of a slot group and a slot according to embodiments of the present disclosure.

For example, as shown in FIG. 10, the groupslot-index is 2 which indicates that the offset of the slot group is 2, that is, PDSCH scheduling is performed on the slot group of slot 1+2=3.

k0 indicates the offset within the slot group, if k0=3, that is, it is in the scheduled slot group, and on slot 3.

Figure 11:
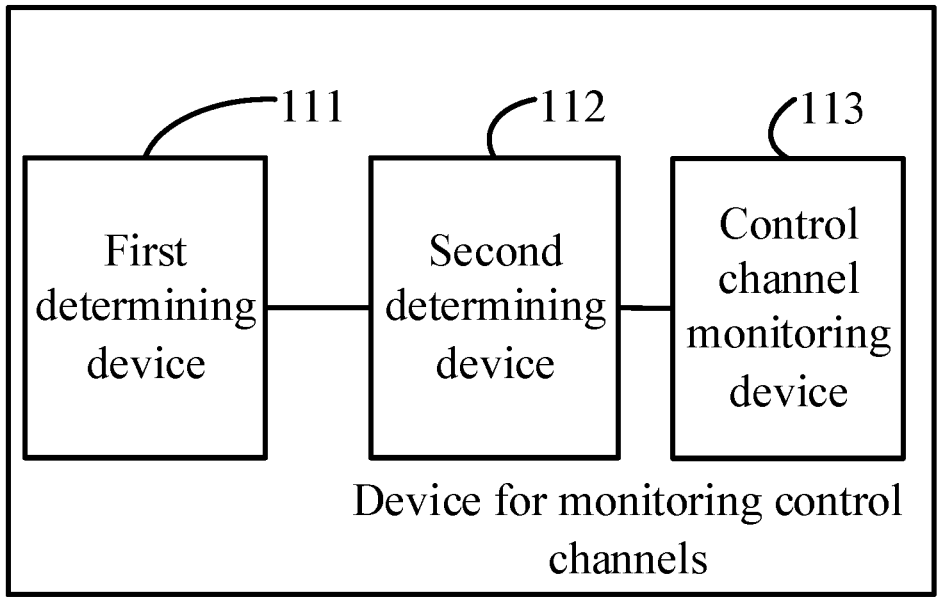
FIG. 11 is a device diagram of a device for monitoring control channels according to embodiments of the present disclosure.

FIG. 11 is a device diagram of a device for monitoring control channels according to embodiments of the present disclosure. The device for monitoring the control channels can be used for a terminal. As shown in FIG. 11, the device may include:
a first determining device 111, used to determine a monitoring slot group for control channel monitoring, where the monitoring slot group is used for characterizing a slot group capable of sharing control channel monitoring capability under a specified slot condition;
a second determining device 112, used to determine a search space of the monitoring slot group; and
a control channel monitoring device 113, used to monitor the control channels indicated by the search space.

Further, on the basis of the above device, the specified slot condition includes that a sub-carrier spacing (SCS) is greater than 120 KHz; and the sharing control channel monitoring capability is used for characterizing a control channel monitoring capability corresponding to more than one slots.

Further, on the basis of the above devices, the first determining device 111 may include:
a first determining sub-device, used to determine a first configuration information for the monitoring slot group according to an interface protocol between a first node and a second node, and determine the monitoring slot group according to the first configuration information; or
a second determining sub-device, used to receive the first configuration information indicated by a base station, and determine the monitoring slot group according to the first configuration information.

Further, on the basis of the above devices, the first configuration information includes at least one of
a number of slots included in the monitoring slot group;
a maximum number of control channel candidates in the monitoring slot group; or
a maximum number of control channel elements (CCEs) in the monitoring slot group.

Further, the first configuration information further satisfies at least one of
the number of slots is associated with the SCS;
the maximum number of control channel candidates is associated with the SCS; or
the maximum number of CCEs is associated with the SCS.

Further, the number of slots is 4 in case that the SCS is 480 KHz; and the number of slots is 8 in case that the SCS is 960 KHz.

Further, the number of slots is determined based on a ratio of the SCS to a preset reference SCS.

Further, on the basis of the above devices, the control channel monitoring device 113 may include:
a first monitoring sub-device, used to monitor the control channels indicated by the search space when a number of control channels to be monitored is not greater than the maximum number of control channel candidates.

Further, on the basis of the above devices, the second determining device 112 may include:
a third determining sub-device, used to determine a second configuration information for the search space according to an interface protocol between a first node and a second node, and determine the search space according to the second configuration information; or
a fourth determining sub-device, used to receive the second configuration information indicated by a base station, and determine the search space according to the second configuration information.

Further, on the basis of the above devices, the second configuration information includes:
first indication information, used for indicating a monitoring slot group with a control channel monitoring occasion; and
second indication information, used for indicating that the control channel monitoring occasion is at a designated position in the monitoring slot group, where the designated position includes one designated slot or a plurality of designated slots in the monitoring slot group.

Further, on the basis of the above devices, the second configuration information further includes:
an offset of start position of the monitoring slot group, where the offset of start position is used for indicating respective slots included in the monitoring slot group.

Further, on the basis of the above devices, the control channel monitoring device 113 may include:
a second monitoring sub-device, used to monitor the control channels at one designated slot or the plurality of designated slots within the monitoring slot group.

Further, on the basis of the above devices, the device further includes:
a shared data channel transmitting device, used to receive or transmit a shared data channel according to the one or more monitored control information after the control channel monitoring within all search spaces in the monitoring slot group has been completed.

It should be noted here that the devices provided in these embodiments can implement all the method steps that can be implemented by the above method embodiments, and can achieve the same beneficial effects, then the same content and beneficial effects in these device embodiments and the above method embodiments will not be described in detail here.

Figure 12:
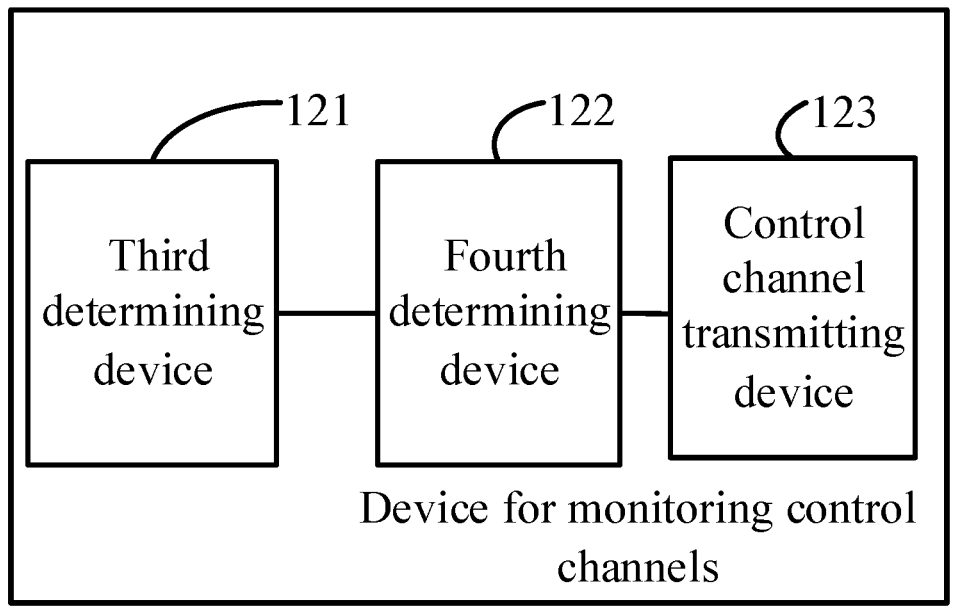
FIG. 12 is a device diagram of a device for monitoring control channels according to embodiments of the present disclosure.

FIG. 12 is a device diagram of a device for monitoring control channels according to embodiments of the present disclosure. The device may be used for a base station. As shown in FIG. 12, the device may include:
a third determining device 121, used to determine a monitoring slot group for control channel monitoring, where the monitoring slot group is used for characterizing a slot group capable of sharing control channel monitoring capability under a specified slot condition;
a fourth determining device 122, used to determine a search space of the monitoring slot group;
a control channel transmitting device 123, used to transmit control channels indicated by the search space for indicating a terminal to monitor the control channels indicated by the search space.

Further, on the basis of the above devices, the specified slot condition includes that a sub-carrier spacing (SCS) is greater than 120 KHz; the sharing control channel monitoring capability is used for characterizing a control channel monitoring capability corresponding to more than one slots.

Further, on the basis of the above devices, the third determining device 121 includes:
a fifth determining sub-device, used to determine a first configuration information for the monitoring slot group according to an interface protocol between a first node and a second node;
a sixth determining sub-device, used to determine the monitoring slot group according to the first configuration information.

Further, on the basis of the above devices, the first configuration information includes at least one of
a number of slots included in the monitoring slot group;
a maximum number of control channel candidates in the monitoring slot group; or
a maximum number of control channel elements (CCEs) in the monitoring slot group.

Further, the first configuration information further satisfies at least one of
the number of slots is associated with the SCS;
the maximum number of control channel candidates is associated with the SCS; or
the maximum number of CCEs is associated with the SCS.

Further, the number of slots is 4 in case that the SCS is 480 KHz; and the number of slots is 8 in case that the SCS is 960 KHz.

Further, the number of slots is determined based on a ratio of the SCS to a preset reference SCS.

Further, on the basis of the above devices, the fourth determining device 122 may include:
a seventh determining sub-device, used to determine a second configuration information for the search space according to an interface protocol between a first node and a second node;
an eighth determining sub-device, used to determine the search space according to the second configuration information.

Further, on the basis of the above devices, the second configuration information includes:
first indication information, used for indicating a monitoring slot group with a control channel monitoring occasion;
second indication information, used for indicating that the control channel monitoring occasion is at a designated position in the monitoring slot group, where the designated position includes one designated slot or a plurality of designated slots in the monitoring slot group.

Further, on the basis of the above devices, the second configuration information further includes:
an offset of start position of the monitoring slot group, where the offset of start position is used for indicating respective slots included in the monitoring slot group.

Further, on the basis of the above devices, the control channel transmitting device 123 is specifically used to transmit the control channel at one designated slot or the plurality of designated slots in the monitoring slot group.

Further, on the basis of the above devices, the control channel transmitting device 123 may include:
a transmitting sub-device, used to transmit a control information within one or more search spaces in the monitoring slot group for indicating the terminal to receive or transmit a shared data channel according to the one or more monitored control information after the control channel monitoring within all search spaces in the monitoring slot group has been completed.

It should be noted here that the devices provided in these embodiments can implement all the method steps that can be implemented by the above method embodiments, and can achieve the same beneficial effects, then the same content and beneficial effects in these device embodiments and the above method embodiments will not be described in detail here.

Figure 13:
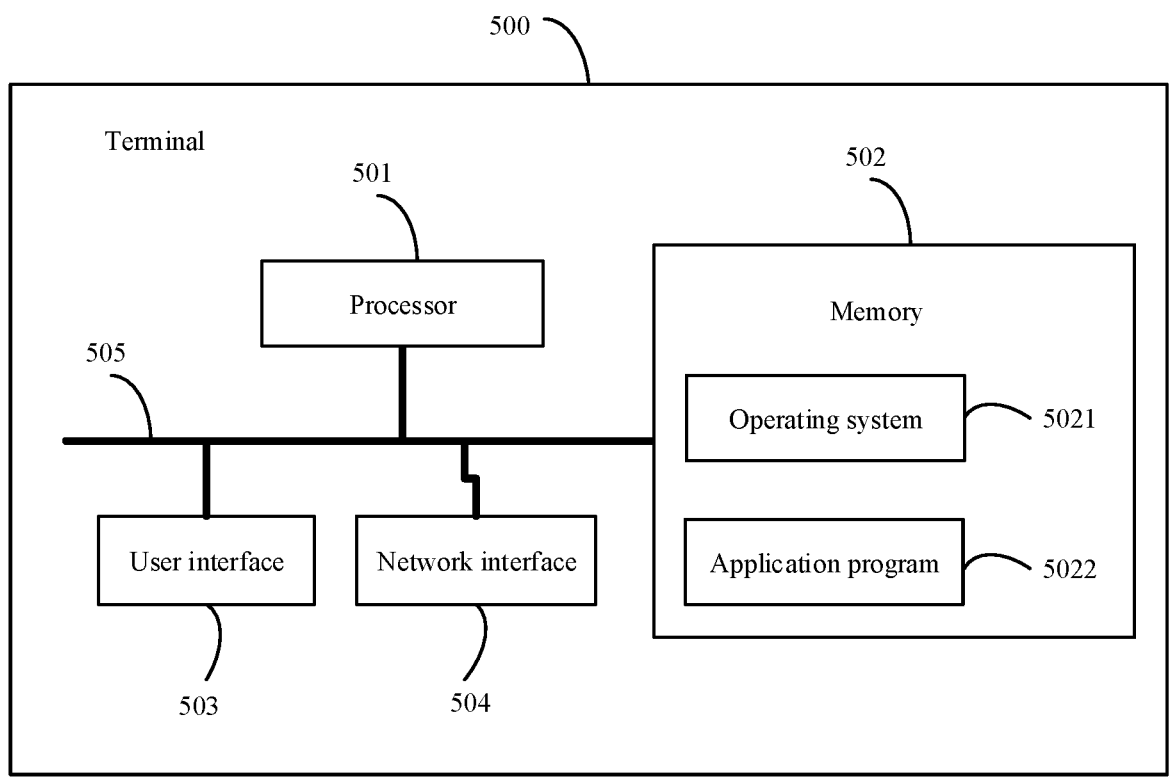
FIG. 13 is a schematic structural diagram of a terminal according to embodiments of the present disclosure.

FIG. 13 is a schematic structural diagram of a terminal according to embodiments of the present disclosure. As shown in FIG. 13, a terminal 500 may include: at least one processor 501, a memory 502, at least one network interface 504 and another user interfaces 503. The various components in terminal 500 are coupled together through a bus system 505. The bus system 505 is used to perform the connection communication between these components. In addition to the data bus, the bus system 505 also includes a power bus, a control bus and a status signal bus. However, for clarity of illustration, the various buses are labeled as the bus system 505 in FIG. 13.

The user interface 503 may include a display, a keyboard, or a clicking device, such as a mouse, a trackball, a touch pad, or a touch screen.

It should be noted that the memory 502 in this embodiment of the present disclosure may be a volatile memory or a non-volatile memory, or may include both volatile and non-volatile memory. The non-volatile memory may be read-only memory (ROM), programmable ROM (PROM), erasable PROM (EPROM), electrically EPROM (EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 502 of the systems and methods described in various embodiments of the present disclosure is intended to include, but not be limited to, these and any other suitable types of memory.

In some embodiments, the memory 502 stores the following components: executable devices or data structures, or subsets thereof, or extended sets of them, such as: operating system 5021 and application program 5022.

The operating system 5021 includes various system programs, such as a framework layer, a core library layer, a driver layer and the like, to implement various basic services and process hardware-based tasks. The application program 5022 includes various application programs, such as a media player, a browser and the like, to implement various application services. The program for performing the methods of the embodiments of the present disclosure may be included in the application program 5022.

In an embodiment of the present disclosure, by calling the computer program or instruction stored in the memory 502, specifically, it can be a computer program or instruction stored in the application program 5022, the processor 501 is used for:
  determining a monitoring slot group for control channel monitoring, where the monitoring slot group is used for characterizing a slot group capable of sharing control channel monitoring capability under a specified slot condition;
  determining a search space of the monitoring slot group; and
  monitoring control channels indicated by the search space.

The methods disclosed in the above embodiments of the present disclosure may be applied to the processor 501, or implemented by the processor 501. The processor 501 may be an integrated circuit chip with signal processing capability. In the implementation process, each step of the above methods may be completed by an integrated logic circuit of hardware in the processor 501 or an instruction in the form of software. The above processor 501 may be a general purpose processor, a digital signal processor (DSP), an application specific integrated circuit (ASIC), a field programmable gate array (FPGA) or other programmable logic devices, discrete gate or transistor logic devices, discrete hardware components. The methods, steps, and logic block diagrams disclosed in the embodiments of this application may be implemented or executed. A general purpose processor may be a microprocessor or the processor may be any conventional processor and the like. The steps of the method disclosed in conjunction with the embodiments of the present disclosure may be directly embodied as executed by a hardware decoding processor, or executed by a combination of hardware and software modules in the decoding processor. The software modules may be located in random access memory, flash memory, read-only memory, programmable read-only memory or electrically erasable programmable memory, registers and other storage media mature in the art. The storage medium is located in the memory 502, and the processor 501 reads the information in the memory 502, and completes the steps of the above methods in combination with its hardware.

It should be noted that the embodiments described herein may be implemented in hardware, software, firmware, middleware, microcode, or a combination thereof. For hardware implementation, the processing unit may be implemented in one or more application specific integrated circuits (ASIC), digital signal processing (DSP), DSP device (DSPD), programmable logic device (PLD), field-programmable gate array (FPGA), general purpose processor, controller, micro-controller, microprocessor, other electronic unit for performing the functions described in this application or a combination thereof.

For software implementation, the described techniques can be implemented through devices (such as procedures, functions and the like) that perform the functions described in the embodiments of the present disclosure. Software codes can be stored in memory and executed by a processor. The memory can be implemented in the processor or external to the processor.

In another embodiment, the specified slot condition includes that a sub-carrier spacing (SCS) is greater than 120 KHz; and the sharing control channel monitoring capability is used for characterizing a control channel monitoring capability corresponding to more than one slots.

In another embodiment, the determining a monitoring slot group for control channel monitoring includes:
  determining first configuration information for the monitoring slot group according to an interface protocol between a first node and a second node, and determining the monitoring slot group according to the first configuration information; or
  receiving the first configuration information indicated by a base station, and determining the monitoring slot group according to the first configuration information.

In another embodiment, the first configuration information includes at least one of
  a number of slots included in the monitoring slot group;
  a maximum number of control channel candidates in the monitoring slot group; or
  a maximum number of control channel elements (CCEs) in the monitoring slot group.

In another embodiment, the first configuration information further satisfies at least one of
  the number of slots is associated with the SCS;
  the maximum number of control channel candidates is associated with the SCS; or
  the maximum number of CCEs is associated with the SCS.

In another embodiment, the number of slots is 4 in case that the SCS is 480 KHz; and the number of slots is 8 in case that the SCS is 960 KHz.

In another embodiment, the number of slots is determined based on a ratio of the SCS to a preset reference SCS.

In another embodiment, the monitoring control channels indicated by the search space includes:

monitoring control channels indicated by the search space when a number of control channels to be monitored is not greater than the maximum number of control channel candidates.

In another embodiment, the determining the search space of the monitoring slot group includes:

determining second configuration information for the search space according to an interface protocol between a first node and a second node, and determining the search space according to the second configuration information; or receiving the second configuration information indicated by a base station, and determining the search space according to the second configuration information.

In another embodiment, the second configuration information includes:

a first indication information, used for indicating a monitoring slot group with a control channel monitoring occasion; and a second indication information, used for indicating that the control channel monitoring occasion is at a designated position in the monitoring slot group, where the designated position includes one designated slot or a plurality of designated slots in the monitoring slot group.

In another embodiment, the second configuration information further includes:

an offset of start position of the monitoring slot group, where the offset of start position is used for indicating respective slots included in the monitoring slot group.

In another embodiment, the monitoring control channels indicated by the search space includes:

monitoring the control channels at one designated slot or the plurality of designated slots in the monitoring slot group.

In another embodiment, the processor 501 is further used for:

receiving or transmitting a shared data channel according to the one or more monitored control information after the control channel monitoring within all search spaces in the monitoring slot group has been completed.

The terminals provided in these embodiments of the present disclosure can implement each process implemented by the terminal in the foregoing embodiments, and details are not described herein again to avoid repetition.

It can be seen from the above embodiments that by determining a monitoring slot group for control channel monitoring, where the monitoring slot group is used for characterizing a slot group capable of sharing control channel monitoring capability under a specified slot condition, determining a search space of the monitoring slot group, and monitoring control channels indicated by the search space, the control channels are monitored in a unit of a monitoring slot group, and the problem that a terminal is unable to complete the process of receiving and configuring a control signaling in the corresponding slot due to the increase in the SCS is avoided, and the complexity of the terminal to perform control channel monitoring is also reduced.

Figure 14:
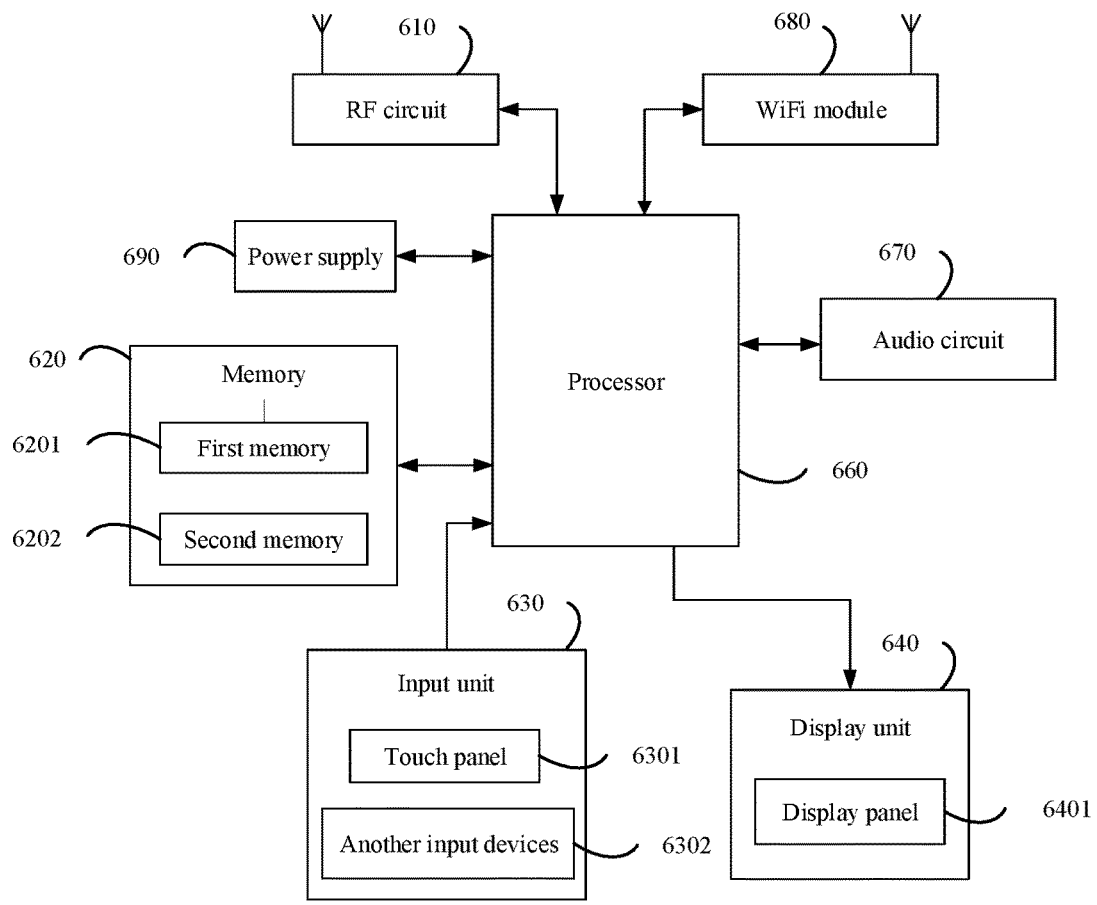
FIG. 14 is another schematic structural diagram of a terminal according to embodiments of the present disclosure.

FIG. 14 is a schematic structural diagram of another terminal provided by an embodiment of the present disclosure. The terminal in FIG. 14 may be a mobile phone, a tablet computer, a personal digital assistant (PDA), or an electronic reader, a handheld game console, point of sales (POS), vehicle electronic devices (such as vehicle computers) and the like. As shown in FIG. 14, the terminal includes a radio frequency (RF) circuit 610, a memory 620, an input unit 630, a display unit 640, a processor 660, an audio circuit 670, a wireless fidelity (WiFi) device 680 and a power supply 690. The structure of the terminal shown in FIG. 14 does not constitute a limitation on the terminal, and may include more or less components than those shown in the figure, or combine some components, or separate some components, or have different component arrangements.

The input unit 630 can be used for receiving the numerical or character information input by the user, and generating the signal input related to the user setting and function control of the terminal. Specifically, in this embodiment of the present disclosure, the input unit 630 may include a touch panel 6301. The touch panel 6301 is also known as the touch screen, which can collect the user's touch operations on or near it (such as the user's operations on the touch panel 6301 using any suitable objects or accessories such as fingers, stylus and the like) and drives the corresponding connection devices according to preset programs. In an embodiment, the touch panel 6301 may include a touch detection device and a touch controller. The touch detection device is configured to detect the user's touch orientation, detect the signal brought by the touch operation, and transmit the signal to the touch controller; the touch controller is configured to receive the touch information from the touch detection device, convert it into contact coordinates, and then send it to the processor 660, and can receive the commands sent by the processor 660 and execute them. In addition, the touch panel 6301 can be implemented in various types such as resistive, capacitive, infrared, and surface acoustic waves. In addition to the touch panel 6301, the input unit 630 may also include other input devices 6302, which may be used to receive input numeric or character information, and generate key signal input related to user settings and function control of the terminal. Specifically, other input devices 6302 may include, but not limited to, one or more of physical keyboards, function keys (such as volume control keys, switch keys and the like), trackballs, mice, joysticks, optical mice (optical mice are touch-sensitive mice that do not display visual output surface, or an extension of a touch-sensitive surface formed by a touch screen) and the like.

The display unit 640 may be used to display information input by the user or information provided to the user and various menu interfaces of the terminal. The display unit 640 may include a display panel 6401. The display panel 6401 can be configured in the form of a liquid crystal display (LCD), an organic light-emitting diode (OLED) and the like.

It should be noted that the touch panel 6301 can cover the display panel 6401 to form a touch display screen. When the touch display screen detects a touch operation on or near it, the touch operation is transmitted to the processor 660 to determine the type of touch event, and then the processor 660 provides corresponding visual output on the touch display screen according to the type of touch event.

The touch screen includes the application program interface display area and the common control display area. The arrangement of the application program interface display area and the common control display area is not limited, and may be an arrangement that can distinguish the two display areas, such as up-down arrangement, left-right arrangement and the like. The application program interface display area can be used to display the interface of the application program. Each interface may contain at least one application icon and/or interface components such as widget desktop controls. The application program interface display area can also be an empty interface that does not contain any content. The common control display area is used to display controls with high usage rate, such as setting buttons, interface numbers, scroll bars, phonebook icons and other application icons.

The RF circuit 610 can be used for receiving and sending signals during sending and receiving information or during a call. In particular, after being received from the network side, the downlink information is processed by the processor 660. In addition, the related uplink data is sent to the network side. Typically, the RF circuit 610 includes, but not limited to, an antenna, at least one amplifier, a transceiver, a coupler, a low noise amplifier (LNA), a duplexer and the like. In addition, RF circuitry 610 may also communicate with networks and other devices via wireless communications. The wireless communication can use any communication standard or protocol, including but not limited to global system of mobile communication (GSM), general packet radio service (GPRS), code division multiple access (CDMA), wideband code division multiple access (WCDMA), long term evolution (LTE), email, short messaging service (SMS) and the like.

The memory 620 is used to store software programs and modules, and the processor 660 executes various functional applications and data processing of the terminal by running the software programs and modules stored in the memory 620. The memory 620 may mainly include a stored program area and a stored data area, where the stored program area may store an operating system, an application program required for at least one function (such as a sound playback function, an image playback function and the like) and the like; the stored data area may store the data created according to the usage of the terminal (such as audio data, phone book and the like) and the like. Additionally, the memory 620 may include high speed random access memory, and may also include non-volatile memory, such as at least one magnetic disk storage device, a flash memory device, or other volatile solid state storage device.

The processor 660 is the control center of the terminal, using various interfaces and lines to connect various parts of the entire mobile phone, running or executing the software programs and/or modules stored in a first memory 6201, and calling the data stored in a second memory 6202, to perform various functions of the terminal and process data, to monitor the terminal as a whole. In one embodiment, the processor 660 may include one or more processing units.

In this embodiment of the present disclosure, by calling the software programs and/or modules stored in the first memory 6201 and/or data stored in the second memory 6202, the processor 660 is used for:

determining a monitoring slot group for control channel monitoring, where the monitoring slot group is used for characterizing a slot group capable of sharing control channel monitoring capability under a specified slot condition;

determining a search space of the monitoring slot group; and monitoring control channels indicated by the search space.

In another embodiment, the specified slot condition includes that a sub-carrier spacing (SCS) is greater than 120 KHz; the sharing control channel monitoring capability is used for characterizing a control channel monitoring capability corresponding to more than one slots.

In another embodiment, the determining a monitoring slot group for control channel monitoring includes:

determining first configuration information for the monitoring slot group according to an interface protocol between a first node and a second node, and determining the monitoring slot group according to the first configuration information; or receiving the first configuration information indicated by a base station, and determining the monitoring slot group according to the first configuration information.

In another embodiment, the first configuration information includes at least one of a number of slots included in the monitoring slot group;
a maximum number of control channel candidates in the monitoring slot group; or
a maximum number of control channel elements (CCEs) in the monitoring slot group.

In an embodiment, the first configuration information further satisfies at least one of:

the number of slots is associated with the SCS;
the maximum number of control channel candidates is associated with the SCS; or
the maximum number of CCEs is associated with the SCS.

In an embodiment, the number of slots is 4 in case that the SCS is 480 KHz; and the number of slots is 8 in case that the SCS is 960 KHz.

In an embodiment, the number of slots is determined based on a ratio of the SCS to a preset reference SCS.

In another embodiment, the monitoring control channels indicated by the search space includes:

monitoring control channels indicated by the search space when a number of control channels to be monitored is not greater than the maximum number of control channel candidates.

In another embodiment, the determining the search space of the monitoring slot group includes:

determining second configuration information for the search space according to an interface protocol between a first node and a second node, and determining the search space according to the second configuration information; or receiving the second configuration information indicated by a base station, and determining the search space according to the second configuration information.

In another embodiment, the second configuration information includes:

first indication information, used for indicating a monitoring slot group with a control channel monitoring occasion; and second indication information, used for indicating that the control channel monitoring occasion is located at a designated position in the monitoring slot group, where the designated position includes one designated slot or a plurality of designated slots in the monitoring slot group.

In another embodiment, the second configuration information further includes: an offset of start position of the monitoring slot group, where the offset of start position is used for indicating respective slots included in the monitoring slot group.

In another embodiment, the monitoring control channels indicated by the search space includes:

monitoring the control channels at one designated slot or the plurality of designated slots in the monitoring slot group.

In another embodiment, the processor 660 is further used for:

receiving or transmitting a shared data channel according to the one or more monitored control information after the control channel monitoring within all search spaces in the monitoring slot group has been completed.

The terminals according to these embodiments of the present disclosure can implement each process implemented by the terminal in the foregoing embodiments, and details are not described herein again to avoid repetition.

It can be seen from the above embodiments that by determining a monitoring slot group for control channel monitoring, where the monitoring slot group is used for characterizing a slot group capable of sharing control channel monitoring capability under a specified slot condition, determining a search space of the monitoring slot group, and monitoring control channels indicated by the search space, the control channels are monitored in a unit of a monitoring slot group, and the problem that a terminal is unable to complete the process of receiving and configuring a control signaling in the corresponding slot due to the increase in the SCS is avoided, and the complexity of the terminal to perform control channel monitoring is also reduced.

Figure 15:
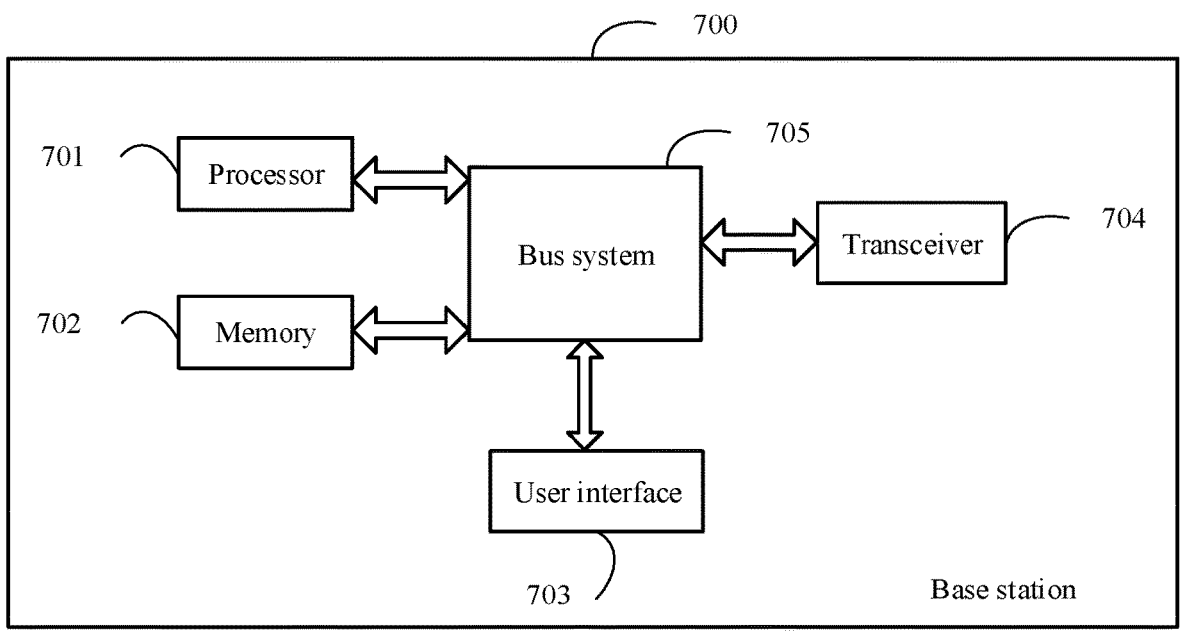
FIG. 15 is a schematic structural diagram of a base station according to embodiments of the present disclosure.

FIG. 15 is a schematic structural diagram of a base station according to an embodiment of the present disclosure. As shown in FIG. 15, the base station 700 may include at least one processor 701, a memory 702, at least one other user interface 703, and a transceiver 704. Various components in the base station 700 are coupled together through a bus system 705. It can be understood that the bus system 705 is used to implement the connection communication between these components. In addition to the data bus, the bus system 705 also includes a power bus, a control bus and a status signal bus. However, for the sake of clarity, the various buses are labeled as the bus system 705 in FIG. 15, and the bus system may include any number of interconnected buses and bridges. Specifically, one or more processors represented by the processor 701 and various circuits represented by the memory 702 are linked together. The bus system can also link together various other circuits, such as peripheral devices, voltage regulators, and power management circuits, which are well known in the art, and therefore will not be further described in this embodiment of the present disclosure. The bus interface provides an interface. The transceiver 704 may be multiple components, that is, including a transmitter and a receiver, which provides a unit for communicating with various other devices on a transmission medium. For different user equipment, the user interface 703 may also be an interface capable of externally connecting and internally connecting the required equipment, and the connected equipment includes but is not limited to a keypad, a display, a speaker, a microphone, a joystick, and the like.

It can be understood that the memory 702 in this embodiment of the present disclosure may be a volatile memory or a non-volatile memory, or may include both volatile and non-volatile memory. The non-volatile memory may be read-only memory (ROM), programmable ROM (PROM), erasable PROM (EPROM), electrically EPROM (EEPROM) or flash memory. The volatile memory may be random access memory (RAM), which is used as an external cache. By way of example and not limitation, many forms of RAM are available, such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM) and direct Rambus RAM (DRRAM). The memory 702 of the systems and methods described in various embodiments of the present disclosure is intended to include, but not be limited to, these and any other suitable types of memory.

The processor 701 is responsible for managing the bus system and general processing, and the memory 702 can store computer programs or instructions used by the processor 701 when performing operations. Specifically, the processor 701 can be used for:

determining a monitoring slot group for control channel monitoring, where the monitoring slot group is used for characterizing a slot group capable of sharing control channel monitoring capability under a specified slot condition;

determining a search space of the monitoring slot group; and transmitting control channels indicated by the search space for indicating a terminal to monitor the control channels indicated by the search space.

The methods disclosed in the above embodiments of the present disclosure may be applied to the processor 701 or implemented by the processor 701. The processor 701 may be an integrated circuit chip with signal processing capability. In the implementation process, each step of the above methods may be completed by an integrated logic circuit of hardware in the processor 701 or an instruction in the form of software. The above processor 701 may be a general purpose processor, a digital signal processor (DSP), an application specific integrated circuit (ASIC), a field programmable gate array (FPGA) or other programmable logic devices, discrete gate or transistor logic devices, discrete hardware components. The methods, steps, and logic block diagrams disclosed in the embodiments of this application may be implemented or executed. A general purpose processor may be a microprocessor or the processor may be any conventional processor and the like. The steps of the method disclosed in conjunction with the embodiments of the present disclosure may be directly embodied as executed by a hardware decoding processor, or executed by a combination of hardware and software modules in the decoding processor. The software modules may be located in random access memory, flash memory, read-only memory, programmable read-only memory or electrically erasable programmable memory, registers and other storage media mature in the art. The storage medium is located in the memory 702, and the processor 701 reads the information in the memory 702, and completes the steps of the above method in combination with its hardware.

It will be appreciated that the embodiments described herein may be implemented in hardware, software, firmware, middleware, microcode, or a combination thereof. For hardware implementation, the processing unit may be implemented in one or more application specific integrated circuits (ASIC), digital signal processing (DSP), DSP device (DSPD), programmable logic device (PLD), field-programmable gate array (FPGA), general purpose processor, controller, micro-controller, microprocessor, other electronic unit for performing the functions described in this application or a combination thereof.

For software implementation, the described techniques can be implemented through modules (such as procedures, functions and the like) that perform the functions described in the embodiments of the present disclosure. Software codes can be stored in memory and executed by a processor. The memory can be implemented in the processor or external to the processor.

In another embodiment, the specified slot condition includes that a sub-carrier spacing (SCS) is greater than 120 KHz; and the sharing control channel monitoring capability is used for characterizing a control channel monitoring capability corresponding to more than one slots.

In another embodiment, the determining a monitoring slot group for control channel monitoring includes:

determining first configuration information for the monitoring slot group according to an interface protocol between a first node and a second node, and determining the monitoring slot group according to the first configuration information.

In another embodiment, the first configuration information includes at least one of:

a number of slots included in the monitoring slot group;

a maximum number of control channel candidates in the monitoring slot group; or a maximum number of control channel elements (CCEs) in the monitoring slot group.

In another embodiment, the first configuration information further satisfies at least one of:

the number of slots is associated with the SCS;

the maximum number of control channel candidates is associated with the SCS; or the maximum number of CCEs is associated with the SCS.

In another embodiment, the determining the search space of the monitoring slot group includes:

determining second configuration information for the search space according to an interface protocol between a first node and a second node; and determining the search space according to the second configuration information.

In another embodiment, the second configuration information includes:

first indication information, used for indicating a monitoring slot group with a control channel monitoring occasion; and second indication information, used for indicating that the control channel monitoring occasion is at a designated position in the monitoring slot group, where the designated position includes one designated slot or a plurality of designated slots in the monitoring slot group.

In another embodiment, the second configuration information further includes: an offset of start position of the monitoring slot group, where the offset of start position is used for indicating respective slots included in the monitoring slot group.

In another embodiment, the transmitting the control channels indicated by the search space includes:

transmitting the control channel at one designated slot or the plurality of designated slots in the monitoring slot group.

In another embodiment, the transmitting the control channels indicated by the search space includes:

transmitting a control information within one or more search spaces in the monitoring slot group for indicating the terminal to receive or transmit a shared data channel according to the one or more monitored control information after the control channel monitoring within all search spaces in the monitoring slot group has been completed.

The base stations provided in these embodiments of the present disclosure can implement each process implemented by the base station in the foregoing embodiments, and details are not described herein again to avoid repetition.

It can be seen from the above embodiments that by determining a monitoring slot group for control channel monitoring, where the monitoring slot group is used for characterizing a slot group capable of sharing control channel monitoring capability under a specified slot condition, determining a search space of the monitoring slot group, and transmitting control channels indicated by the search space for indicating a terminal to monitor the control channels indicated by the search space, control channels are monitored in a unit of a monitoring slot group by the terminal, and the problem that a terminal is unable to complete the process of receiving and configuring a control signaling in the corresponding slot due to the increase in the SCS is avoided, especially the monitoring capability of a slot group is integrated in the search space of the slot group, which improves the scheduling flexibility of the base station.

The foregoing mainly introduces the solutions according to the embodiments of the present disclosure from the perspective of base stations. It can be understood that, in order to implement the above functions, the base station provided in the embodiments of the present disclosure includes hardware structures and/or software modules corresponding to executing each function. The unit and algorithm steps of each example described in conjunction with the embodiments disclosed in the present disclosure can be implemented in hardware or in the form of a combination of hardware and computer software.

Whether a function is performed by hardware or computer software driving hardware depends on the specific application and design constraints of the solution. The described functionality using different methods for each particular application, but such implementations should not be considered beyond the scope of this application.

In this embodiment of the present disclosure, division of functional modules may be performed on base stations and the like according to the foregoing method examples. For example, each functional module may be divided corresponding to each function, and two or more functions may be integrated into one processing module. The above integrated modules can be implemented in the form of hardware, and can also be implemented in the form of software function modules.

It should be noted that, the division of modules in the embodiments of the present disclosure is schematic, and is only a logical function division, and there may be other division manners in actual implementation.

Only the division of the above functional modules is used for illustration. In practical applications, the above functions can be assigned to different functional modules as required, that is, the internal structure of the device is divided into different functional modules to complete all or part of the functions described above. For the specific working process of the system, apparatus and unit described above, reference may be made to the corresponding process in the foregoing method embodiments, and details are not described herein again.

In the several embodiments provided in this application, the disclosed apparatus and method may be implemented in other manners. For example, the device embodiments described above are only illustrative. For example, the division of the modules or units is only a kind of logical function division, and there may be other division manners in actual implementation. For example, multiple units or components may be in combination or integrated into another system, or some features may be omitted, or not implemented. Besides, the shown or discussed mutual coupling or direct coupling or communication connection may be indirect coupling or communication connection of devices or units through some interfaces.

The units described as separate components may or may not be physically separated, and components displayed as units may or may not be physical units, that is, may be located in one place, or may be distributed to multiple network units. Part or all of the units may be selected according to actual needs to achieve the purpose of the solution in this embodiment.

In addition, each functional unit in each embodiment of the present disclosure may be integrated into one processing unit, or each unit may exist physically alone, or two or more units may be integrated into one unit. The above integrated single components can be implemented in the form of software functional units.

The integrated unit, if implemented in the form of a software functional unit and sold or used as an independent product, may be stored in a computer-readable storage medium. Based on this understanding, all or part of the solution can be embodied in the form of a software product, and the computer software product is stored in a storage medium, and includes several instructions to cause a computer device (which can be a personal computer, a server, or a network device or the like) or a processor to execute all or part of the steps of the methods described in the various embodiments of the present disclosure. The computer storage medium is a non-transitory medium, including: flash memory, removable hard disk, read-only memory, random access memory, magnetic disk or optical disk and other mediums that can store program codes.

On the other hand, an embodiment of the present disclosure further provides a non-transitory computer-readable storage medium having a computer program stored thereon, and the computer program, when executed by a processor, causes the processor to perform the methods provided by the foregoing embodiments, including:

determining a monitoring slot group for control channel monitoring, where the monitoring slot group is used for characterizing a slot group capable of sharing control channel monitoring capability under a specified slot condition;

determining a search space of the monitoring slot group; and monitoring control channels indicated by the search space.

On the other hand, an embodiment of the present disclosure further provides a non-transitory computer-readable storage medium having a computer program stored thereon and the computer program, when executed by a processor causes the processor to perform the methods provided by the foregoing embodiments, including:

determining a monitoring slot group for control channel monitoring, where the monitoring slot group is used for characterizing a slot group capable of sharing control channel monitoring capability under a specified slot condition;

determining a search space of the monitoring slot group; transmitting control channels indicated by the search space for indicating a terminal to monitor the control channels indicated by the search space.

What is claimed is:

1. A method for monitoring control channels, performed by a terminal, comprising:
   determining a monitoring slot group for control channel monitoring, wherein the monitoring slot group is used for characterizing a slot group capable of sharing, under a specified slot condition, control channel monitoring capability, and the control channel monitoring capability shared by the slot group comprises a maximum number of control channel candidates corresponding to the slot group or a maximum number of control channel elements (CCEs) corresponding to the slot group;
   determining a search space of the monitoring slot group; and
   monitoring control channels indicated by the search space.

2. The method of claim 1, wherein the specified slot condition comprises that a sub-carrier spacing (SCS) of each control channel is greater than 120 KHz; and the sharing control channel monitoring capability is used for characterizing a control channel monitoring capability corresponding to more than one slots.

3. The method of claim 1, wherein the determining a monitoring slot group for control channel monitoring comprises:
   determining first configuration information for the monitoring slot group according to an interface protocol between a first node and a second node, and determining the monitoring slot group according to the first configuration information; or
   receiving the first configuration information indicated by a base station, and determining the monitoring slot group according to the first configuration information.

4. The method of claim 3, wherein the first configuration information comprises at least one of:
   a number of slots included in the monitoring slot group;
   a maximum number of control channel candidates in the monitoring slot group; or
   a maximum number of control channel elements (CCEs) in the monitoring slot group.

5. The method of claim 4, wherein the first configuration information further satisfies at least one of:
   the number of slots is associated with the SCS;
   the maximum number of control channel candidates is associated with the SCS; or
   the maximum number of CCEs is associated with the SCS;
   wherein the number of slots is 4 in case that the SCS is 480 KHz; and the number of slots is 8 in case that the SCS is 960 KHz;
   the maximum number of candidate control channels increases as SCS increases, or the maximum candidate control channel number remains unchanged as SCS increases;
   the maximum number of CCEs increases as SCS increases, or the maximum number of CCEs remains unchanged as SCS increases.

6. The method of claim 4, wherein the number of slots is determined based on a ratio of the SCS to a preset reference SCS.

7. The method of claim 4, wherein the monitoring control channels indicated by the search space comprises:
   monitoring control channels indicated by the search space when a number of control channels to be monitored is not greater than the maximum number of control channel candidates.

8. The method of claim 1, wherein the determining the search space of the monitoring slot group comprises:
   determining second configuration information for the search space according to an interface protocol between a first node and a second node, and determining the search space according to the second configuration information; or
   receiving the second configuration information indicated by a base station, and determining the search space according to the second configuration information.

9. The method of claim 8, wherein the second configuration information comprises:
   first indication information, used for indicating a monitoring slot group with a control channel monitoring occasion;

second indication information, used for indicating that the control channel monitoring occasion is at a designated position in the monitoring slot group, wherein the designated position comprises one designated slot or a plurality of designated slots in the monitoring slot group, and a symbol of value 1 in a string monitoringslotWithinSlotgroupBITSTRING indicates the designated slot; and an offset of start position of the monitoring slot group, wherein the offset of start position is used for indicating respective slots included in the monitoring slot group.

10. The method of claim 9, wherein the monitoring control channels indicated by the search space comprises:
monitoring the control channels at one designated slot or the plurality of designated slots in the monitoring slot group.

11. The method of claim 1, further comprising:
receiving or transmitting a shared data channel according to one or more monitored control information after the control channel monitoring within all search spaces in the monitoring slot group has been completed.

12. A method for monitoring control channels, performed by a base station, comprising:
determining a monitoring slot group for control channel monitoring, wherein the monitoring slot group is used for characterizing a slot group capable of sharing, under a specified slot condition, control channel monitoring capability, and the control channel monitoring capability shared by the slot group comprises a maximum number of control channel candidates corresponding to the slot group or a maximum number of control channel elements (CCEs) corresponding to the slot group;
determining a search space of the monitoring slot group; and
transmitting control channels indicated by the search space for indicating a terminal to monitor the control channels indicated by the search space.

13. The method of claim 12, wherein the specified slot condition comprises that a sub-carrier spacing (SCS) of each control channel is greater than 120 KHz; and
the sharing control channel monitoring capability is used for characterizing a control channel monitoring capability corresponding to more than one slots.

14. The method of claim 12, wherein the determining a monitoring slot group for control channel monitoring comprises:
determining first configuration information for the monitoring slot group according to an interface protocol between a first node and a second node, and
determining the monitoring slot group according to the first configuration information.

15. The method of claim 14, wherein the first configuration information comprises at least one of:
a number of slots included in the monitoring slot group;
a maximum number of control channel candidates in the monitoring slot group; or
a maximum number of control channel elements (CCEs) in the monitoring slot group;
the number of slots is 4 in case that the SCS is 480 KHz; and the number of slots is 8 in case that the SCS is 960 KHz;
the maximum number of candidate control channels increases as SCS increases, or the maximum candidate control channel number remains unchanged as SCS increases;
the maximum number of CCEs increases as SCS increases, or the maximum number of CCEs remains unchanged as SCS increases.

16. The method of claim 15, wherein the number of slots is determined based on a ratio of the SCS to a preset reference SCS.

17. The method of claim 12, wherein the determining the search space of the monitoring slot group comprises:
determining second configuration information for the search space according to an interface protocol between a first node and a second node; and
determining the search space according to the second configuration information;
wherein the second configuration information comprises:
first indication information, used for indicating a monitoring slot group with a control channel monitoring occasion;
second indication information, used for indicating that the control channel monitoring occasion is at a designated position in the monitoring slot group, wherein the designated position comprises one designated slot or a plurality of designated slots in the monitoring slot group, and a symbol of value 1 in a string monitoringslotWithinSlotgroupBITSTRING indicates the designated slot;
an offset of start position of the monitoring slot group, wherein the offset of start position is used for indicating respective slots included in the monitoring slot group;
wherein the transmitting the control channels indicated by the search space comprises:
transmitting the control channels at one designated slot or the plurality of designated slots in the monitoring slot group.

18. The method of claim 12, wherein the transmitting the control channels indicated by the search space comprises:
transmitting control information within one or more search spaces in the monitoring slot group for indicating the terminal to receive or transmit a shared data channel according to the one or more monitored control information after the control channel monitoring within all search spaces in the monitoring slot group has been completed.

19. A terminal, comprising a processor and a memory storing a program that is executable by the processor, wherein the program, when executed by the processor, causes the processor to perform the following steps:
determining a monitoring slot group for control channel monitoring, wherein the monitoring slot group is used for characterizing a slot group capable of sharing, under a specified slot condition, control channel monitoring capability, and the control channel monitoring capability shared by the slot group comprises a maximum number of control channel candidates corresponding to the slot group or a maximum number of control channel elements (CCEs) corresponding to the slot group;
determining a search space of the monitoring slot group; and
monitoring control channels indicated by the search space.

20. A base station, comprising a memory, a processor and a memory storing a program that is executable by the processor, wherein the program, when executed by the processor, causes the processor to perform the steps of claim 12.

* * * * *